US008510338B2

(12) United States Patent
Cushman, II et al.

(10) Patent No.: US 8,510,338 B2
(45) Date of Patent: *Aug. 13, 2013

(54) INDEXING INFORMATION ABOUT ENTITIES WITH RESPECT TO HIERARCHIES

(75) Inventors: James B. Cushman, II, Alpharetta, GA (US); Scott Ellard, Marietta, GA (US)

(73) Assignee: International Business Machines Corporation, Armonk, NY (US)

( * ) Notice: Subject to any disclaimer, the term of this patent is extended or adjusted under 35 U.S.C. 154(b) by 177 days.

This patent is subject to a terminal disclaimer.

(21) Appl. No.: 12/421,688

(22) Filed: Apr. 10, 2009

(65) Prior Publication Data
US 2009/0198686 A1 Aug. 6, 2009

Related U.S. Application Data

(63) Continuation of application No. 11/656,111, filed on Jan. 22, 2007, now Pat. No. 7,526,486.

(60) Provisional application No. 60/802,356, filed on May 22, 2006.

(51) Int. Cl.
*G06F 17/30* (2006.01)
*G06F 7/00* (2006.01)

(52) U.S. Cl.
USPC ............... 707/791; 707/800; 706/46; 706/48

(58) Field of Classification Search
None
See application file for complete search history.

(56) References Cited

U.S. PATENT DOCUMENTS

| 4,531,186 A | 7/1985 | Knapman |
| 5,020,019 A | 5/1991 | Ogawa |

(Continued)

FOREIGN PATENT DOCUMENTS

| JP | 2000348042 | 12/2000 |
| JP | 2001236358 | 8/2001 |

(Continued)

OTHER PUBLICATIONS

Fair, "Record Linkage in the National Dose Registry of Canada", European Journal of Cancer, 33:S37-S43, XP005058648 ISSN: 0959-8049, 7 pages.

(Continued)

*Primary Examiner* — Angelica Ruiz
(74) *Attorney, Agent, or Firm* — Elissa Wang; Edell, Shapiro & Finnan, LLC

(57) ABSTRACT

Systems and methods for indexing, associating or compositing data records and hierarchies from various information sources are disclosed. Embodiments of the present invention may provide the ability to link data records and thus to link data records to known hierarchies of data records. More specifically, embodiments of the present invention may provide the capability to associate data records in varying information sources and to thereby associate incoming data record with existing data records or existing data hierarchies such that an incoming data record may not only be associated with an existing data record comprising information about the same entity but may additionally be associated with other members of the data hierarchy in the same manner as the existing data record. In addition to associating an incoming data record with an existing data record and incorporating the incoming data record into an existing data hierarchy, embodiments of the present invention may provide the capability of reconciling an incoming data hierarchy to which an incoming data record belongs with an existing data hierarchy belongs such that the two data hierarchies may be composited.

20 Claims, 25 Drawing Sheets

(56) References Cited

U.S. PATENT DOCUMENTS

| | | |
|---|---|---|
| 5,134,564 A | 7/1992 | Dunn et al. |
| 5,247,437 A | 9/1993 | Vale et al. |
| 5,321,833 A | 6/1994 | Chang et al. |
| 5,323,311 A | 6/1994 | Fukao et al. |
| 5,333,317 A | 7/1994 | Dann |
| 5,381,332 A | 1/1995 | Wood |
| 5,442,782 A | 8/1995 | Malatesta et al. |
| 5,497,486 A | 3/1996 | Stolfo et al. |
| 5,535,322 A | 7/1996 | Hecht |
| 5,535,382 A | 7/1996 | Ogawa |
| 5,537,590 A * | 7/1996 | Amado ................................ 1/1 |
| 5,555,409 A | 9/1996 | Leenstra et al. |
| 5,561,794 A | 10/1996 | Fortier |
| 5,583,763 A | 12/1996 | Atcheson et al. |
| 5,600,835 A | 2/1997 | Garland et al. |
| 5,606,690 A | 2/1997 | Hunter et al. |
| 5,615,367 A | 3/1997 | Bennett et al. |
| 5,640,553 A | 6/1997 | Schultz |
| 5,651,108 A | 7/1997 | Cain et al. |
| 5,675,752 A | 10/1997 | Scott et al. |
| 5,675,753 A | 10/1997 | Hansen et al. |
| 5,694,593 A | 12/1997 | Baclawski |
| 5,694,594 A | 12/1997 | Chang |
| 5,710,916 A | 1/1998 | Barbara et al. |
| 5,734,907 A | 3/1998 | Jarossay et al. |
| 5,765,150 A | 6/1998 | Burrows |
| 5,774,661 A | 6/1998 | Chatterjee |
| 5,774,883 A | 6/1998 | Andersen |
| 5,774,887 A | 6/1998 | Wolff et al. |
| 5,778,370 A | 7/1998 | Emerson |
| 5,787,431 A | 7/1998 | Shaughnessy |
| 5,787,470 A | 7/1998 | DeSimone et al. |
| 5,790,173 A | 8/1998 | Strauss |
| 5,796,393 A | 8/1998 | MacNaughton et al. |
| 5,805,702 A | 9/1998 | Curry |
| 5,809,499 A | 9/1998 | Wong et al. |
| 5,819,264 A | 10/1998 | Palmon et al. |
| 5,835,712 A | 11/1998 | DuFresne |
| 5,835,912 A | 11/1998 | Pet |
| 5,848,271 A | 12/1998 | Caruso et al. |
| 5,859,972 A | 1/1999 | Subramaniam et al. |
| 5,862,322 A | 1/1999 | Anglin et al. |
| 5,862,325 A | 1/1999 | Reed et al. |
| 5,878,043 A | 3/1999 | Casey |
| 5,893,074 A | 4/1999 | Hughes et al. |
| 5,893,110 A | 4/1999 | Weber et al. |
| 5,905,496 A | 5/1999 | Lau et al. |
| 5,930,768 A | 7/1999 | Hooban |
| 5,960,411 A | 9/1999 | Hartman et al. |
| 5,963,915 A | 10/1999 | Kirsch |
| 5,987,422 A | 11/1999 | Buzsaki |
| 5,991,758 A | 11/1999 | Ellard |
| 5,999,937 A | 12/1999 | Ellard |
| 6,014,664 A | 1/2000 | Fagin et al. |
| 6,016,489 A | 1/2000 | Cavanaugh et al. |
| 6,018,733 A | 1/2000 | Kirsch et al. |
| 6,018,742 A | 1/2000 | Herbert, III |
| 6,026,433 A | 2/2000 | D'Arlach et al. |
| 6,049,847 A | 4/2000 | Vogt et al. |
| 6,067,549 A | 5/2000 | Smalley et al. |
| 6,069,628 A | 5/2000 | Farry et al. |
| 6,078,325 A | 6/2000 | Jolissaint et al. |
| 6,108,004 A | 8/2000 | Medl |
| 6,134,581 A | 10/2000 | Ismael et al. |
| 6,185,608 B1 | 2/2001 | Hon et al. |
| 6,223,145 B1 | 4/2001 | Hearst |
| 6,269,373 B1 | 7/2001 | Apte et al. |
| 6,297,824 B1 | 10/2001 | Hearst et al. |
| 6,298,478 B1 | 10/2001 | Nally et al. |
| 6,311,190 B1 | 10/2001 | Bayer et al. |
| 6,327,611 B1 | 12/2001 | Everingham |
| 6,330,569 B1 | 12/2001 | Baisley et al. |
| 6,349,325 B1 * | 2/2002 | Newcombe et al. ........... 709/202 |
| 6,356,931 B2 | 3/2002 | Ismael et al. |
| 6,374,241 B1 | 4/2002 | Lamburt et al. |
| 6,385,600 B1 | 5/2002 | McGuinness et al. |
| 6,389,429 B1 | 5/2002 | Kane et al. |
| 6,446,188 B1 | 9/2002 | Henderson et al. |
| 6,449,620 B1 | 9/2002 | Draper et al. |
| 6,457,065 B1 | 9/2002 | Rich et al. |
| 6,460,045 B1 | 10/2002 | Aboulnaga et al. |
| 6,496,793 B1 | 12/2002 | Veditz et al. |
| 6,502,099 B1 | 12/2002 | Rampy |
| 6,510,505 B1 | 1/2003 | Burns et al. |
| 6,523,019 B1 | 2/2003 | Borthwick |
| 6,529,888 B1 | 3/2003 | Heckerman et al. |
| 6,556,983 B1 | 4/2003 | Altschuler et al. |
| 6,557,100 B1 | 4/2003 | Knutson |
| 6,621,505 B1 | 9/2003 | Beauchamp et al. |
| 6,633,878 B1 | 10/2003 | Underwood |
| 6,633,882 B1 | 10/2003 | Fayyad et al. |
| 6,633,992 B1 | 10/2003 | Rosen |
| 6,647,383 B1 | 11/2003 | August et al. |
| 6,662,180 B1 | 12/2003 | Aref et al. |
| 6,687,702 B2 | 2/2004 | Vaitheeswaran et al. |
| 6,704,805 B1 | 3/2004 | Acker et al. |
| 6,718,535 B1 | 4/2004 | Underwood |
| 6,742,003 B2 * | 5/2004 | Heckerman et al. ................ 1/1 |
| 6,757,708 B1 | 6/2004 | Craig et al. |
| 6,795,793 B2 | 9/2004 | Shayegan et al. |
| 6,807,537 B1 | 10/2004 | Thiesson et al. |
| 6,842,761 B2 | 1/2005 | Diamond et al. |
| 6,842,906 B1 | 1/2005 | Bowman-Amuah |
| 6,879,944 B1 | 4/2005 | Tipping et al. |
| 6,907,422 B1 | 6/2005 | Predovic |
| 6,912,549 B2 | 6/2005 | Rotter et al. |
| 6,922,695 B2 | 7/2005 | Skufca et al. |
| 6,957,186 B1 | 10/2005 | Guheen et al. |
| 6,990,636 B2 | 1/2006 | Beauchamp et al. |
| 6,996,565 B2 | 2/2006 | Skufca et al. |
| 7,035,809 B2 | 4/2006 | Miller et al. |
| 7,043,476 B2 * | 5/2006 | Robson ................................ 1/1 |
| 7,099,857 B2 | 8/2006 | Lambert |
| 7,143,091 B2 | 11/2006 | Charnock et al. |
| 7,155,427 B1 | 12/2006 | Prothia |
| 7,181,459 B2 | 2/2007 | Grant et al. |
| 7,249,131 B2 | 7/2007 | Skufca et al. |
| 7,330,845 B2 | 2/2008 | Lee et al. |
| 7,487,173 B2 | 2/2009 | Medicke et al. |
| 7,526,486 B2 | 4/2009 | Cushman, II et al. |
| 7,567,962 B2 | 7/2009 | Chakrabarti et al. |
| 7,620,647 B2 | 11/2009 | Stephens et al. |
| 7,627,550 B1 | 12/2009 | Adams et al. |
| 7,685,093 B1 | 3/2010 | Adams et al. |
| 7,698,268 B1 | 4/2010 | Adams et al. |
| 7,788,274 B1 | 8/2010 | Ionescu |
| 8,321,383 B2 | 11/2012 | Schumacher et al. |
| 8,321,393 B2 | 11/2012 | Adams et al. |
| 8,332,366 B2 | 12/2012 | Schumacher et al. |
| 2002/0007284 A1 | 1/2002 | Schurenberg et al. |
| 2002/0073099 A1 | 6/2002 | Gilbert et al. |
| 2002/0080187 A1 | 6/2002 | Lawton |
| 2002/0087599 A1 | 7/2002 | Grant et al. |
| 2002/0095421 A1 | 7/2002 | Koskas |
| 2002/0099694 A1 | 7/2002 | Diamond et al. |
| 2002/0152422 A1 | 10/2002 | Sharma et al. |
| 2002/0156917 A1 | 10/2002 | Nye |
| 2002/0178360 A1 | 11/2002 | Wenocur et al. |
| 2003/0004770 A1 | 1/2003 | Miller et al. |
| 2003/0004771 A1 | 1/2003 | Yaung |
| 2003/0018652 A1 * | 1/2003 | Heckerman et al. ........ 707/104.1 |
| 2003/0023471 A1 | 1/2003 | Lee et al. |
| 2003/0051063 A1 | 3/2003 | Skufca et al. |
| 2003/0065826 A1 | 4/2003 | Skufca et al. |
| 2003/0065827 A1 | 4/2003 | Skufca et al. |
| 2003/0105825 A1 | 6/2003 | Kring et al. |
| 2003/0120630 A1 | 6/2003 | Tunkelang |
| 2003/0145002 A1 | 7/2003 | Kleinberger et al. |
| 2003/0158850 A1 | 8/2003 | Lawrence et al. |
| 2003/0174179 A1 | 9/2003 | Suermondt et al. |
| 2003/0182101 A1 | 9/2003 | Lambert |
| 2003/0195836 A1 | 10/2003 | Hayes et al. |
| 2003/0195889 A1 | 10/2003 | Yao et al. |
| 2003/0195890 A1 | 10/2003 | Oommen |

| | | | |
|---|---|---|---|
| 2003/0220858 A1 | 11/2003 | Lam et al. | |
| 2003/0227487 A1 | 12/2003 | Hugh | |
| 2004/0107189 A1 | 6/2004 | Burdick et al. | |
| 2004/0107205 A1 | 6/2004 | Burdick et al. | |
| 2004/0122790 A1 | 6/2004 | Walker et al. | |
| 2004/0143477 A1 | 7/2004 | Wolff | |
| 2004/0143508 A1 | 7/2004 | Bohn et al. | |
| 2004/0181526 A1 | 9/2004 | Burdick et al. | |
| 2004/0181554 A1 | 9/2004 | Heckerman et al. | |
| 2004/0220926 A1 | 11/2004 | Lamkin et al. | |
| 2004/0260694 A1 | 12/2004 | Chaudhuri et al. | |
| 2005/0004895 A1 | 1/2005 | Schurenberg et al. | |
| 2005/0015381 A1 | 1/2005 | Clifford et al. | |
| 2005/0015675 A1 | 1/2005 | Kolawa et al. | |
| 2005/0050068 A1 | 3/2005 | Vaschillo et al. | |
| 2005/0055345 A1 | 3/2005 | Ripley | |
| 2005/0060286 A1 | 3/2005 | Hansen et al. | |
| 2005/0071194 A1 | 3/2005 | Bormann et al. | |
| 2005/0075917 A1 | 4/2005 | Flores et al. | |
| 2005/0114369 A1 | 5/2005 | Gould et al. | |
| 2005/0149522 A1 | 7/2005 | Cookson et al. | |
| 2005/0154615 A1 | 7/2005 | Rotter et al. | |
| 2005/0210007 A1 | 9/2005 | Beres et al. | |
| 2005/0228808 A1 | 10/2005 | Mamou et al. | |
| 2005/0240392 A1 | 10/2005 | Munro et al. | |
| 2005/0256740 A1 | 11/2005 | Kohan et al. | |
| 2005/0256882 A1 | 11/2005 | Able et al. | |
| 2005/0273452 A1 | 12/2005 | Molloy et al. | |
| 2006/0053151 A1* | 3/2006 | Gardner et al. | 707/102 |
| 2006/0053172 A1* | 3/2006 | Gardner et al. | 707/203 |
| 2006/0053173 A1* | 3/2006 | Gardner et al. | 707/203 |
| 2006/0053382 A1* | 3/2006 | Gardner et al. | 715/764 |
| 2006/0064429 A1 | 3/2006 | Yao | |
| 2006/0074832 A1* | 4/2006 | Gardner et al. | 706/45 |
| 2006/0074836 A1* | 4/2006 | Gardner et al. | 706/60 |
| 2006/0080312 A1 | 4/2006 | Friedlander et al. | |
| 2006/0116983 A1* | 6/2006 | Dettinger et al. | 707/3 |
| 2006/0117032 A1* | 6/2006 | Dettinger et al. | 707/100 |
| 2006/0129605 A1 | 6/2006 | Doshi | |
| 2006/0129971 A1 | 6/2006 | Rojer | |
| 2006/0136205 A1 | 6/2006 | Song | |
| 2006/0161522 A1 | 7/2006 | Dettinger et al. | |
| 2006/0167896 A1 | 7/2006 | Kapur et al. | |
| 2006/0179050 A1 | 8/2006 | Giang et al. | |
| 2006/0190445 A1 | 8/2006 | Risberg et al. | |
| 2006/0195560 A1 | 8/2006 | Newport | |
| 2006/0265400 A1 | 11/2006 | Fain et al. | |
| 2006/0271401 A1 | 11/2006 | Lassetter et al. | |
| 2006/0271549 A1 | 11/2006 | Rayback et al. | |
| 2006/0287890 A1 | 12/2006 | Stead et al. | |
| 2007/0005567 A1 | 1/2007 | Hermansen et al. | |
| 2007/0016450 A1 | 1/2007 | Bhora et al. | |
| 2007/0055647 A1 | 3/2007 | Mullins et al. | |
| 2007/0067285 A1 | 3/2007 | Blume et al. | |
| 2007/0073678 A1 | 3/2007 | Scott et al. | |
| 2007/0073745 A1 | 3/2007 | Scott et al. | |
| 2007/0094060 A1 | 4/2007 | Apps et al. | |
| 2007/0150279 A1 | 6/2007 | Gandhi et al. | |
| 2007/0192715 A1 | 8/2007 | Kataria et al. | |
| 2007/0198481 A1 | 8/2007 | Hogue et al. | |
| 2007/0198600 A1 | 8/2007 | Betz | |
| 2007/0214129 A1 | 9/2007 | Ture et al. | |
| 2007/0214179 A1 | 9/2007 | Hoang | |
| 2007/0217676 A1 | 9/2007 | Grauman et al. | |
| 2007/0250487 A1 | 10/2007 | Reuther | |
| 2007/0260492 A1 | 11/2007 | Feied et al. | |
| 2007/0276844 A1 | 11/2007 | Segal et al. | |
| 2007/0276858 A1 | 11/2007 | Cushman et al. | |
| 2007/0299697 A1 | 12/2007 | Friedlander et al. | |
| 2007/0299842 A1 | 12/2007 | Morris et al. | |
| 2008/0005106 A1 | 1/2008 | Schumacher et al. | |
| 2008/0016218 A1 | 1/2008 | Jones et al. | |
| 2008/0069132 A1 | 3/2008 | Ellard et al. | |
| 2008/0120432 A1 | 5/2008 | Lamoureux et al. | |
| 2008/0126160 A1 | 5/2008 | Takuechi et al. | |
| 2008/0243832 A1 | 10/2008 | Adams et al. | |
| 2008/0243885 A1 | 10/2008 | Harger et al. | |
| 2008/0244008 A1 | 10/2008 | Wilkinson et al. | |
| 2008/0276221 A1 | 11/2008 | Lev et al. | |
| 2009/0089317 A1 | 4/2009 | Ford et al. | |
| 2009/0089332 A1 | 4/2009 | Harger et al. | |
| 2009/0089630 A1 | 4/2009 | Goldenberg et al. | |
| 2009/0198686 A1 | 8/2009 | Cushman, II et al. | |
| 2010/0114877 A1 | 5/2010 | Adams et al. | |
| 2010/0174725 A1 | 7/2010 | Adams et al. | |
| 2010/0175024 A1 | 7/2010 | Schumacher et al. | |
| 2011/0010214 A1 | 1/2011 | Carruth | |
| 2011/0010346 A1 | 1/2011 | Goldenberg et al. | |
| 2011/0010401 A1 | 1/2011 | Adams et al. | |
| 2011/0010728 A1 | 1/2011 | Goldenberg et al. | |
| 2011/0047044 A1 | 2/2011 | Wright et al. | |
| 2011/0191349 A1 | 8/2011 | Ford et al. | |

FOREIGN PATENT DOCUMENTS

| | | |
|---|---|---|
| JP | 2005063332 | 3/2005 |
| JP | 2006163941 | 6/2006 |
| JP | 2006277413 | 10/2006 |
| WO | 9855947 A1 | 12/1998 |
| WO | 0159586 | 8/2001 |
| WO | 0159586 A2 | 8/2001 |
| WO | 0175679 A1 | 10/2001 |
| WO | 03021485 | 3/2003 |
| WO | 2004023297 A1 | 3/2004 |
| WO | 2004023311 A1 | 3/2004 |
| WO | 2004023345 A1 | 3/2004 |
| WO | 2009042931 A1 | 4/2009 |
| WO | 2009042941 A1 | 4/2009 |

OTHER PUBLICATIONS

International Search Report and Written Opinion, for pct/us2007/012073, Mailed Jul. 23, 2008, 12 pages.
International Preliminary Report on Patentability Issued in PCT/US2007/013049, Mailed Dec. 17, 2008.
International Search Report and Written Opinion issued in PCT/US2007/013049, mailed Jun. 13, 2008.
Office Action issued in U.S. Appl. No. 11/809,792, mailed Aug. 21, 2009, 14 pages.
Oracle Data Hubs: "The Emperor Has No Clothes?", Feb. 21, 2005, Google.com, pp. 1-9.
IEEE, no matched results, Jun. 30, 2009, p. 1.
IEEE No matched Results, 1 Page, Sep. 11, 2009.
Office Action issued in U.S. Appl. No. 11/522,223 dated Aug. 20, 2008, 16 pgs.
Office Action issued in U.S. Appl. No. 11/522,223 dated Feb. 5, 2009, Adams, 17 pages.
Notice of Allowance issued for U.S. Appl. No. 11/522,223, dated Sep. 17, 2009, 20 pages.
De Rose, et al. "Building Structured Web Community Portals: A Top-Down, Compositional, and Incremental Approach", VDLB, ACM, pp. 399-410, Sep. 2007.
Microsoft Dictionary, "normalize", at p. 20, Fifth Edition, Microsoft Corp., downloaded from http://proquest.safaribooksonline.com/0735614954 on Sep. 8, 2008.
Office Action issued in U.S. Appl. No. 11/521,928 dated Apr. 1, 2009, 22 pages.
Office Action issued in U.S. Appl. No. 11/521,928 dated Sep. 16, 2008, 14 pages.
Notice of Allowance issued for U.S. Appl. No. 11/521,928, dated Sep. 18, 2009, 20 pages.
Gopalan Suresh Raj, Modeling Using Session and Entity Beans, Dec. 1998, Web Cornucopia, pp. 1-15.
Scott W. Ambler, Overcoming Data Design Challenges, Aug. 2001, pg. 1-3.
XML, Java, and the future of the Web, Bosak, J., Sun Microsystems, Mar. 10, 1997, pp. 1-9.
Integrated Document and Workflow Management applied to Offer Processing a Machine Tool Company, Stefan Morschheuser, et al., Dept. of Information Systems I, COOCS '95 Milpitas CA, ACM 0-89791-706-5/95, p. 106-115.
International Search Report mailed on Jul. 19, 2006, for PCT/IL2005/000784 (6 pages).
Hamming Distance, HTML. Wikipedia.org, Available: http://en.wikipedia.org/wiki/Hamming_distance (as of May 8, 2008).

Office Action Issued in U.S. Appl. No. 11/521,946 mailed May 14, 2008, 10 pgs.
Office Action issued in U.S. Appl. No. 11/521,946 mailed Dec. 9, 2008, 10 pgs.
Office Action issued in U.S. Appl. No. 11/521,946 mailed May 13, 2009, 12 pgs.
Freund et al., Statistical Methods, 1993, Academic Press Inc., United Kingdom Edition, pp. 112-117.
Merriam-Webster dictionary defines "member" as "individuals".
Waddington, D., "Does it signal convergence of operational and analytic MDM?" retrieved from the internet:<URL: http://www.intelligententerprise.com>, 2 pages, Aug. 2006.
International Search Report mailed on Oct. 10, 2008, for PCT Application No. PCT/US07/20311 (10 pp).
International Search Report and Written Opinion issued in PCT/US07/89211, mailing date of Jun. 20, 2008.
International Search Report and Written Opinion for PCT/US08/58404, dated Aug. 15, 2008.
International Preliminary Report on Patentability Under Chapter 1 for PCT Application No. PCT/US2008/058665, issued Sep. 29, 2009, mailed Oct. 8, 2009, 6 pgs.
International Search Report and Written Opinion mailed on Dec. 3, 2008 for International Patent Application No. PCT/US2008/077985.
Gu, Lifang, et al., "Record Linkage: Current Practice and Future Directions," CSIRO Mathematical and Informational Sciences, 2003, pp. 1-32.
O'Hara-Schettino, et al., "Dynamic Navigation in Multiple View Software Specifications and Designs," Journal of Systems and Software, vol. 41, Issue 2, May 1998, pp. 93-103.
International Search Report and Written Opinion mailed on Oct. 10, 2008 for PCT Application No. PCT/US08/68979.
International Search Report and Written Opinion mailed on Dec. 2, 2008 for PCT/US2008/077970.
Martha E. Fair, et al., "Tutorial on Record Linkage Slides Presentation", Chapter 12, pp. 457-479.
International Search Report and Written Opinion mailed on Aug. 28, 2008 for Application No. PCT/US2008/58665, 7 pgs.
C.C. Gotlieb, Oral Interviews with C.C. Gotlieb, Apr. 1992, May 1992, ACM, pp. 1-72.
Google.com, no match results, Jun. 30, 2009, p. 1.
Supplementary European Search Report for EP 07 79 5659 dated May 18, 2010, 5 pages.
European Communication for EP 98928878 (PCT/US9811438) dated Feb. 16, 2006.
European Communication for EP 98928878 (PCT/US9811438) dated Mar. 10, 2008.
European Communication for EP 98928878 (PCT/US9811438) dated Jun. 26, 2006.
Gill, "Ox-Link: The Oxford Medical Record Linkage System", Internet Citation, 1997.
Newcombe et al., "The Use of Names for Linking Personal Records", Journal of the American Statistical Association, vol. 87, Dec. 1, 1992, pp. 335-349.
European Communication for EP 07795659 (PCT/US2007013049) dated May 27, 2010.
Jason Woods, et al., "Baja Identity Hub Configuration Process", Publicly available on Apr. 2, 2009, Version 1.3.
Initiate Systems, Inc. "Refining the Auto-Link Threshold Based Upon Scored Sample", Publicly available on Apr. 2, 2009; memorandum.
Initiate Systems, Inc. "Introduction", "False-Positive Rate (Auto-Link Threshold)", Publicly available on Apr. 2, 2009; memorandum.
Jason Woods, "Workbench 8.0 Bucket Analysis Tools", Publicly available on Apr. 2, 2009.
Initiate, "Business Scenario: Multi-Lingual Algorithm and Hub," Publicly available on Apr. 2, 2009.
Initiate, "Business Scenario: Multi-Lingual & Many-To-Many Entity Solutions", Publicly available on Apr. 2, 2009.
Initiate, "Relationships-MLH", presentation; Publicly available on Sep. 28, 2007.
Initiate, "Multi-Lingual Hub Support viaMemtype Expansion", Publicly available on Apr. 2, 2009.
Initiate Systems, Inc. "Multi-Language Hubs", memorandum; Publicly available on Apr. 2, 2009.
Initiate, "Business Scenario: Support for Members in Multiple Entities", Publicly available on Oct. 2, 2008.
Initiate, "Group Entities", Publicly available on Mar. 30, 2007.
Jim Cushman, MIO 0.5: MIO as a Source; Initiate; Publicly available on Oct. 2, 2008.
Initiate, "Provider Registry Functionality", Publicly available on Oct. 2, 2008.
Edward Seabolt, "Requirement Specification Feature #NNNN Multiple Entity Relationship", Version 0.1—Draft; Publicly available on Oct. 2, 2008.
Initiate, "Aruba Training Engine Callouts", presentation; Publicly available on Mar. 30, 2007.
Initiate, "Business Scenario: Callout to Third Party System", Publicly available on Oct. 2, 2008.
John Dorney, "Requirement Specification Feature #NNNN Conditional Governance", Version 1.0—Draft; Publicly available on Oct. 2, 2008.
Initiate, Release Content Specification, Identity Hub Release 6.1, RCS Version 1.0; Publicly available on Sep. 16, 2005.
Initiate, "Initiate Identity Hub™ Manager User Manual", Release 6.1; Publicly available on Sep. 16, 2005.
End User Training CMT; CIO Maintenance Tool (CMT) Training Doc; Publicly available on Sep. 29, 2006.
Sean Stephens, "Requirement Specification B2B Web Client Architecture", Version 0.1—Draft; Publicly available on Sep. 25, 2008.
Initiate, "Java SDK Self-Training Guide", Release 7.0; Publicly available on Mar. 24, 2006.
Initiate, "Memtype Expansion Detailed Design", Publicly available on Apr. 2, 2009.
Ohgaya, Ryosuke et al., "Conceptual Fuzzy Sets-, NAFIPS 2002, Jun. 27-29, 2002, pp. 274-279.Based Navigation System for Yahoo!".
Xue, Gui-Rong et al., "Reinforcing Web-Object Categorization Through Interrelationships", Data Mining and Knowledge Discover, vol. 12, Apr. 4, 2006, pp. 229-248.
Iniate Systems, Inc. "Hierarchy Viewer—OGT 3.0t", www.initiatesystems.com, Publicly available on Sep. 25, 2008.
Adami, Giordano et al., "Clustering Documents in a Web Directory", WIDM '03, New Orleans, LA, Nov. 7-8, 2003, pp. 66-73.
Chen, Hao et al., "Bringing Order to the Web: Automatically Categorizing Search Results", CHI 2000, CHI Letters, vol. 2, Issue 1, Apr. 1-6, 2000, pp. 145-152.
Initiate Systems, Inc. "Implementation Defined Segments—Gap Analysis", (Sep. 15, 2006), Publicly available on Mar. 20, 2008.
Xue, Gui-Rong et al., "Implicit Link Analysis for Small Web Search", SIGIR '03, Toronto, Canada, Jul. 28-Aug. 1, 2003, pp. 56-63.
Liu, Fang et al., "Personalized Web Search for iMproving Retrieval Effectiveness", IEEE Transactions on Knowledge and Data Engineering vol. 16, No. 1, Jan. 2004, pp. 28-40.
Anyanwu, Kemafor et al. "SemRank: Ranking complex Relationship Search Results on the Semantic Web", WWW 2005, Chiba, Japan May 10-14, 2005, pp. 117-127.
International Preliminary Report on Patentability, PCT/US2008/58404, Mar. 21, 2011, 4 pages.
European Search Report/EP07795659.7, Apr. 15, 2011, 7 pages.
Emdad Ahmed, "A Survey on Bioinformatics Data and Service Integration Using Ontology and Declaration Workflow Query Language", Department of Computer Science, Wayne State University, USA, Mar. 15, 2007, pp. 1-67.
International Preliminary Report on Patentability, PCT/US2007/89211, Apr. 30, 2012, 6 pages.
European Search Report/EP07795108.5, May 29, 2012, 6 pages.

* cited by examiner

INDEXING INFORMATION ABOUT ENTITIES WITH RESPECT TO HIERARCHIES

RELATED APPLICATIONS

This application is a continuation of U.S. patent application Ser. No. 11/656,111, entitled "Method and System for Indexing Information about Entities with Respect to Hierarchies" by inventors James B. Cushman II and Scott Ellard filed on Jan. 22, 2007, which claims a benefit of priority to the filing date of U.S. Provisional Patent Application Ser. No. 60/802,356 by inventors Scott Ellard and James B. Cushman II, entitled "System and Method for Indexing Information about Entities to Hierarchies from Different Information Sources" filed on May 22, 2006, the entire contents of which are hereby expressly incorporated by reference for all purposes.

TECHNICAL FIELD OF THE INVENTION

This invention relates generally to a system and method for associating data records within one or more databases, and in particular to a system and method for identifying data records in one or more databases that may contain information about the same entity and associating those data records together for easier access to information about the entity. Even more particularly, the present invention relates to associating one or more data records in a hierarchy that may contain information about the same entity.

BACKGROUND OF THE INVENTION

Data about entities, such as people, products, or parts may be stored in digital format in a computer database. These computer databases permit the data about an entity to be accessed rapidly and permit the data to be cross-referenced to other relevant pieces of data about the same entity. The databases also permit a person to query the database to find data records pertaining to a particular entity. The terms data set, data file, and data source may also refer to a database. A database, however, has several limitations which may limit the ability of a person to find the correct data about an entity within the database. The actual data within the database is only as accurate as the person who entered the data. Thus, a mistake in the entry of the data into the database may cause a person looking for data about an entity in the database to miss some relevant data about the entity because, for example, a last name of a person was misspelled. Another kind of mistake involves creating a new separate record for an entity that already has a record within the database. In a third problem, several data records may contain information about the same entity, but, for example, the names or identification numbers contained in the two data records may be different so that the database may not be able to associate the two data records to each other.

For a business that operates one or more databases containing a large number of data records, the ability to locate relevant information about a particular entity within and among the respective databases is very important, but not easily obtained. Once again, any mistake in the entry of data (including without limitation the creation of more than one data record for the same entity) at any information source may cause relevant data to be missed when the data for a particular entity is searched for in the database. In addition, in cases involving multiple information sources, each of the information sources may have slightly different data syntax or formats which may further complicate the process of finding data among the databases. An example of the need to properly identify an entity referred to in a data record and to locate all data records relating to an entity in the health care field is one in which a number of different hospitals associated with a particular health care organization may have one or more information sources containing information about their patient, and a health care organization collects the information from each of the hospitals into a master database. It is necessary to link data records from all of the information sources pertaining to the same patient to enable searching for information for a particular patient in all of the hospital records.

There are several problems which limit the ability to find all of the relevant data about an entity in such a database. Multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

To reduce the amount of data that must be reviewed and prevent the, user from picking the wrong data record, it is also desirable to identify and associate data records from the various information sources that may contain information about the same entity. There are conventional systems that locate duplicate data records within a database and delete those duplicate data records, but these systems only locate data records which are identical to each other. Thus, these conventional systems cannot determine if two data records, with for example slightly different last names, nevertheless contain information about the same entity. In addition, these conventional systems do not attempt to index data records from a plurality of different information sources, locate data records within the one or more information sources containing information about the same entity, and link those data records together.

These information sources may also impose hierarchical relationships among the various data records pertaining to different entities. These hierarchies may designate a variety of relationships between entities, such as social hierarchies (business organization, army chain of command, and church organization), containment hierarchies (biological taxonomy, geometric subsets, assemblies, bill of materials), genealogy hierarchies, or other parent-child data relationships. Thus, not only is it desirable to identify and associate data records from various data sources, but it may also be desirable to associate data records with a data records in an existing or known hierarchy.

For example, a company may have multiple suppliers of parts where the suppliers may belong to a hierarchy of parent companies and there is a need to determine the level of business with a particular parent company on an ongoing basis. Multiple information sources may contain the different orders for parts from individual companies, while another 3$^{rd}$ party source (such as Dunn & Bradstreet, Equifax, infoUSA, etc.) identifies the parent company hierarchy. It may be desirable to link part suppliers to the hierarchy to determine the amount of business with any particular parent company.

In addition to the problems discussed above with respect to entity matching, the ability to match data records to known hierarchies may present additional problems such as that there may be missing parts of the hierarchy, a data record may match to more than one node of a hierarchy tree, a data record may match to nodes on two separate hierarchy trees or a data record which is a node on one hierarchy tree may match to a node on another hierarchy tree and thus it may be necessary to reconcile the two hierarchy trees with one another.

Thus there is a need for a system and method for indexing information about entities/hierarchies from a plurality of different information sources which avoid these and other problems of known systems and methods, and it is to this end that the present invention is directed.

SUMMARY OF THE INVENTION

Systems and methods for indexing, associating or compositing data records and hierarchies from various information sources are disclosed. Embodiments of the present invention may provide the ability to link data records and thus to link data records to known hierarchies of data records. More specifically, embodiments of the present invention may provide the capability to associate data records in varying information sources and to thereby associate incoming data record with existing data records or existing data hierarchies such that an incoming data record may not only be associated with an existing data record comprising information about the same entity but may additionally be associated with other members of the data hierarchy in the same manner as the existing data record. In addition to associating an incoming data record with an existing data record and incorporating the incoming data record into an existing data hierarchy, embodiments of the present invention may provide the capability of reconciling an incoming data hierarchy to which an incoming data record belongs with an existing data hierarchy belongs such that the two data hierarchies may be composited.

In certain embodiments, the present invention may link data records containing information about the same entity, to integrate data records into existing data hierarchies and to composite (e.g. join or merge) data hierarchies. In one particular embodiment, a data record may be compared to existing data to locate data records containing information about the same entity. The matching operation may use one or more combinations of attributes to retrieve a plurality of candidates, generate a confidence level or score for each candidate and identify data records which have scores greater than or equal to a threshold level. The data record may then be associated with one of the identified data records, integrated into a data hierarchy to which the identified data record belongs, or a data hierarchy to which the data record belongs composited with a data hierarchy to which the identified data record belongs.

Embodiments of the present invention may provide the technical advantages that data record from various information sources may be integrated into existing data hierarchies based on a statistical algorithms, resulting in the disambiguation of various data records and data hierarchies which may be received from a variety of different sources.

Embodiments of the invention disclosed herein can be implemented by programming one or more computer systems or devices with computer-executable instructions embodied in a computer-readable medium. When executed by a processor, these instructions operate to cause these computer systems and devices to perform one or more functions particular to embodiments of the invention disclosed herein (e.g., generate an appropriate confidence level or score for each event.) Programming techniques, computer languages, devices, and computer-readable media necessary to accomplish this are known in the art and thus will not be further described herein.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

FIGS. 16A and 168 are block diagrams illustrating more details of embodiments of a database associated with a master entity index;

DETAILED DESCRIPTION

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

Reference is now made in detail to the exemplary embodiments of the invention, examples of which are illustrated in the accompanying drawings. Wherever possible, the same reference numbers will be used throughout the drawings to refer to the same or like parts (elements). In one embodiment, the system and method of the invention is particularly applicable to a system and method for indexing information from multiple information sources about companies to an explicit business hierarchy such as Dun and Bradstreet (D&B), Experian, or Equifax. It is in this context that the invention will be described. It will be appreciated, however, that the system and method in accordance with the invention has utility in a large number of applications that involve identifying, associating, and structuring into hierarchy information about entities.

Figure 1:
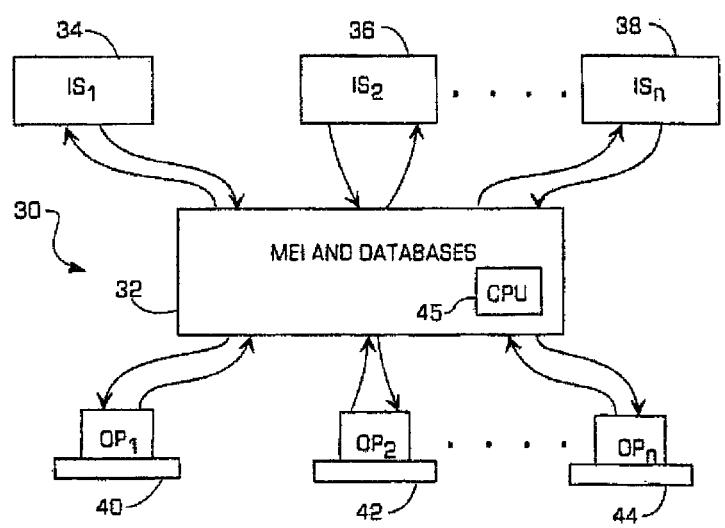
FIG. 1 is a block diagram illustrating a database system that may include a master entity index system in accordance with the invention.

In describing embodiments of the systems and methods of the present invention, it may first be helpful to go over examples of embodiments of systems and methods for associating entities which may be utilized in conjunction with embodiments of the present invention such has those described in U.S. Pat. No. 5,991,758, entitled "System and Method for Indexing Information about Entities from Different Information Sources", issued Nov. 23, 1999 by inventor Scott Ellard hereby incorporated by reference in its entirety. FIG. 1 is a block diagram illustrating a master entity index system 30 in accordance with the invention. The master entity index system may include a master entity index (MEI) 32 that processes, updates and stores data records about one or more entities from one or more information sources 34, 36, 38 and responds to commands or queries from a plurality of operators 40, 42, 44, where the operators may be either users or information systems. The MEI may operate with data records from a single information source or, as shown, data records from one or more information sources. The entities tracked using the MEI may include for example, patients in a hospital, participants in a health care system, parts in a warehouse or any other entity that may have data records and information contained in data records associated with it. The MEI may be a computer system with a central processing unit 45 executing a software application that performs the function of the MEI. The MEI may also be implemented using hardware circuitry.

As shown, the MEI 32 may receive data records from the information sources as well as write corrected data back into the information sources. The corrected data communicated to the information sources may include information that was correct, but has changed, information about fixing information in a data record or information about links between data records. In addition, one of the users 40-44 may transmit a query to the MEI 32 and receive a response to the query back from the MEI. The one or more information sources may be, for example, different databases that possibly have data records about the same entities. For example, in the health care field, each information source may be associated with a particular hospital in the health care organization and the health care organization may use the master entity index system to relate the data records within the plurality of hospitals so that a data record for a patient in Los Angeles may be located when that same patient is on vacation and enters a hospital in New York. The MEI 32 of the master entity index system 30 may be located at a central location and the information sources and users may be located remotely from the MEI and may be connected to the MEI by, for example, a communications link, such as the Internet. The MEI, the one or more information sources and the plurality of users may also be connected together by a communications network, such as a wide area network. The MEI may have its own database that stores the complete data records in the MEI, but the MEI may also only contain sufficient data to identify a data record (e.g., an address in a particular information source) or any portion of the data fields that comprise a complete data record so that the MEI retrieves the entire data record from the information source when needed. The MEI may link data records together containing information about the same entity in an entity identifier or associative database, as described below, separate from the actual data record. Thus, the MEI may maintain links between data records in one or more information sources, but does not necessarily maintain a single uniform data record for an entity. Now, an example of the master entity index system for a health care organization in accordance with the invention will be described.

Figure 2:
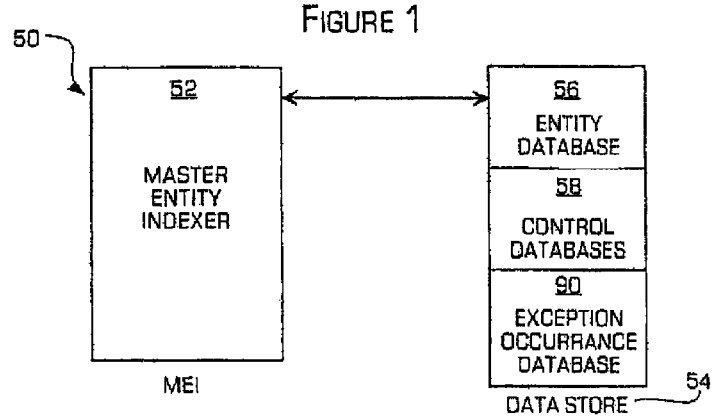
FIG. 2 is a block diagram illustrating a master entity index system and its associated databases in accordance with the invention.

FIG. 2 is a block diagram illustrating an example of a master entity index system 50 for a health care organization. In this example, the master entity index system may include a master entity index 52 and a data store 54. For clarity, the one or more information sources and the multiple users are not shown, but are connected to the master entity index 52 as previously described. The data store 54 may include an entity database 56, one or more control databases 58, and an exception occurrence database. The entity database may store the data from the data records as specified above from the one or more information sources and may separately store links between one or more data records when those data records contain information about the same entity. The entity database may also store an address of a large data record stored in one of the information sources to reduce the storage requirements of the entity database. In this example, the information about entities within the data records may be information about patients within a plurality of hospitals which are owned by a health care organization. The MEI 52 may process the data records from the one or more information sources located at each hospital, identify and associate records that contain information about the same entity, and generate the links between the separate data records when the data records contain information about the same patient.

As data records from the information sources are fed into the MEI, the MEI may attempt to match the incoming data record about an entity to a data record already located in the MEI database. The matching method will be described below with reference to FIG. 15. If the incoming data record matches an existing data record, a link between the incoming data record and the matching data record may be generated. If the incoming data record does not match any of the existing data records in the MEI, a new entity identifier, as described below, may be generated for the incoming data record. In both cases, the incoming data record may be stored in the MEI. Then as additional data records are received from the information sources, these data records are matched to existing data records and the MEI database of data records is increased.

The one or more control databases 58 may be used by the MEI to control the processing of the data records to increase accuracy. For example, one of the control databases may store rules which may be used to override certain anticipated erroneous conclusions that may normally be generated by the MEI. For example, the operator of the MEI may know, due to past experience, that the name of a particular patient is always misspelled in a certain way and provide a rule to force the MEI to associate data records with the known different spellings. The control databases permit the operator to customize the MEI for a particular application or a particular type of information. Thus, For a health care system containing information about a patient, the control databases may contain a rule that the nickname "Bill" is the same as the full name "William." Therefore, the MEI will determine that data records otherwise identical except for the first name of "Bill" and "William" contain information about the same entity and should be linked together. The MEI will now be described in more detail.

Figure 3:
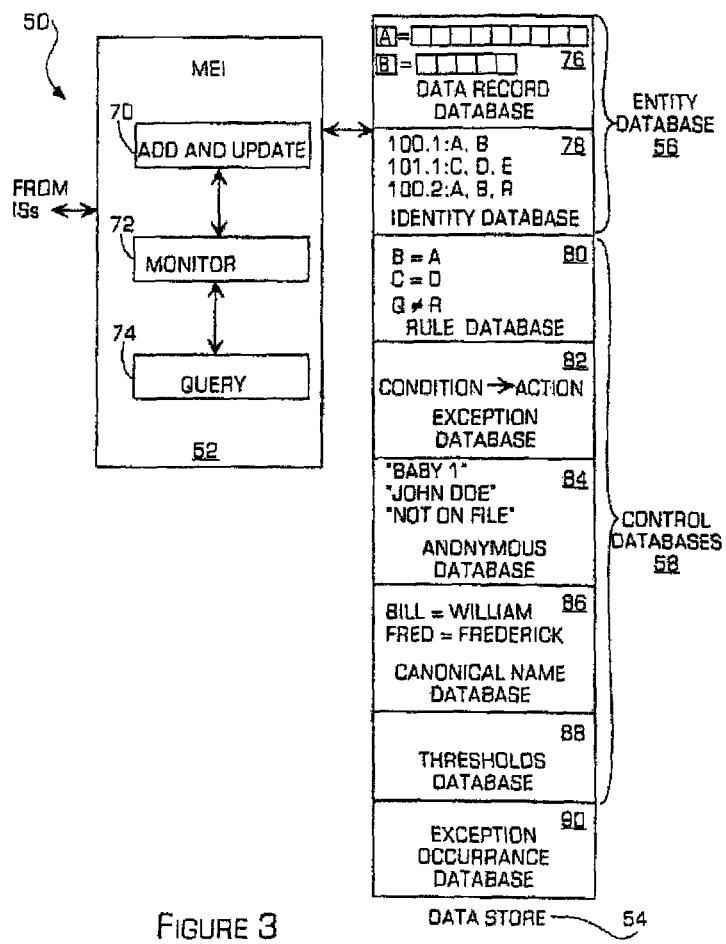
FIG. 3 is a block diagram illustrating more details of the database that are associated with the master entity index.

FIG. 3 is a block diagram illustrating more details of the master entity index system 50, and in particular the MEI 52 and the data store 54. The MEI 52 may include an addition and updating unit 70, a monitor unit 72 and a query unit 74. The addition and updating unit may add data records about a new entity into the data store, update data records in the data store, or add new rules to the control databases. The monitor unit may permit a user of the master entity index system to view special conditions, known as exceptions, generated by the MEI. For example, a data record that requires a person to view the data record due to an error may be tagged and a message to the operator may be generated. The query unit permits a user of the master entity index system to query the MEI about information in the data records or information in the control databases of the MEI and the MEI will return a response to the query including any relevant data records or information. More details of these units and their associated functions will be described below.

For each of the operations of the MEI, including the synthesis, as described below, the querying and the monitoring, the results of those operations may depend on a trust value that may be associated with each data field in a data record. The trust computation for a data field may vary depending on the characteristics of the data field, such as the date on which that data record containing the field was received, or a quantitative characterization of a level of trust of the information source. For example, a data field containing data that was manually entered may have a lower trust value than a data field with data that was transferred directly from another information source. The trust value for a data field may also affect the probability of the matching of data records. Now, the data store 54 of the master entity index system will be described in more detail.

The MEI may provide other operations that can be constructed from combining the operations listed above. For example, an operation to process data records for which it is not known if a data record exists can be constructed by combining the query operation for data records with the add new data record or update existing data record operations. These "composite" operations may lead to better performance than if the operator executed a combination of the basic operations. They also relieve the operator for having to determine the correct sequencing of operations to achieve the desired result.

The data store 54 may include an entity database 56, one or more control databases 58, and an exception occurrence database 90 as described above. The entity database may include a data record database 76 and an identity database 78. The data record database may store the data records or the addresses of the data records in the MEI, as described above, while the associative identity database may store a group of data record identifiers that associate or "link" those data records which contain information about the same entity. The separation of the physical data records from the links between the data records permits more flexibility because a duplicate copy of the data contained in the data record is not required to be present in the identity database. The data record database and the associative database may also be combined if desired.

The identity database represents the combination of data records in the data record database that refer to the same entity. Each entity is assigned an entity identifier. Entity identifiers are based on the concept of "versioned" identification. An entity identifier consists of a base part and a version number. The base part represents a specific individual about whom information is being linked. The version number represents a specific combination of data records that provides information about the entity that is known at a specific time. In this example, the data records are shown as squares with the alphabetic identifier of the data record inside, and the entity identifier is shown as the base part followed by a period followed by a version number. For example, "100.1" indicates an entity identifier with 100 as the base part and 1 as the version number. In this example, entity identifier 100.0 links data records A and B, entity identifier 101.0 links data records C, D and E, and entity identifier 100.2 links data records A, B, and R. Now, the details of the control databases will be described.

The one or more control databases 58 may permit the operator of the master entity index system to customize the MEI's processing based on information known to the operator. The control databases shown are merely illustrative and the MEI may have additional control databases which further permit control of the MEI by the operator. The control databases may, for example, include a rules database 80, an exception handling database 82, an anonymous name database 84, a canonical name database 86, and a thresholds database 88.

The rules database may contain links that the operator of the system has determined are certain and should override the logic of the matching of the MEI. For example, the rules database may contain identity rules (i.e., rules which establish that a link exists between two data records) and/or non-identity rules (i.e., rules which establish that no link exists between two data records). In this example, the rules database contains identity rules which are A=B and C=D and a non-identity rule which is Q.notequal.R. These rules force the MEI to establish links between data records or prevent links from being established between data records. For example, the information sources may have four patients, with data records S, T, U, and V respectively, who are all named George Smith and the operator may enter the following nonidentity rules (i.e. S.notequal.T, T.notequal.U, U.notequal.V, V.notequal.S) to keep the data records of the four different entities separate and unlinked by the MEI. The rules in the rules database may be updated, added or deleted by the operator of the master entity index system as needed.

The exception handling database 82 contains one or more exception handling routines that permit the master entity index system to handle data record problems. The exception handling rules within the database may have the form of "condition.fwdarw.action" processing rules. The actions of these rules may be actions that the MEI should automatically take in response to a condition, for example, to request that an individual manually review a data record. An example of an exception handling rule may be, "if duplicate data record.fwdarrow.delete data record" which instructs the MEI to delete a duplicate data record. Another example is, "if different attributes (sex).forwardarrrow.request further review of data record" which instructs the MEI that if there are two data records that appear to relate to the same entity, but the sex of the entity is different for each data record, the MEI should request further review of the data records. In response to this request, an operator may determine that the data records are the same, with a incorrectly typed sex for one of the records and the operator may enter a rule into the rules database that the two data records are linked together despite the difference in the sex attribute. The exception database may have an associated database 90 (described below) which stores the actual exceptions that occur during processing of the input data records.

The anonymous name database 84 permits the MEI to automatically recognize names that should be ignored for purposes of attempting to match two data records. In this example, the anonymous name database may contain "not on file", "John Doe" and "baby.subtext.1" which are names that may be typically assigned by a hospital to a patient when the hospital has not yet determined the name of the patient. As another example, a part not in a warehouse inventory may be referred to as "not on file" until the part may be entered into the database. These anonymous names may be used by the MEI to detect any of the anonymous names or other "filler" data that hold a space, but have no particular meaning in data records and ignore those names when any matching is conducted because a plurality of data records containing the name of "John Doe" should not be linked together simply because they have the same name.

The canonical name database 86 may permit the MEI to associate short-cut data, such as a nickname, with the full data represented by the short-cut data, such as a person's proper name. In this example for a health care organization, the nickname Bill may be associated with William and Fred may be associated with Frederick. This database permits the MEI to link together two data records that are identical except that one data record uses the first name Bill while the second data record uses the first name William. Without this canonical name database, the MEI may not link these two data records together and some of the information about that patient will be lost. The thresholds database 88 permits the thresholds used by the MEI for matching data records, as described below, to be adjustable. For example, an operator may set a high threshold so that only exact data records are matched to each other. A lower threshold may be set so that a data record with fewer matching data fields may be returned to the user in response to a query. The details of the matching method will be described below in more detail.

The exception occurrence database 90 allows the MEI to maintain a record of all of the exceptions that have occurred. The exception occurrence database may store the actual exception conditions that have arisen during processing. For example, the exception occurrence database may contain an entry that represents that entity 100.2 has two data records with different values for the "sex" attribute.

The operator of the MEI may clear the identity database 78 without clearing the data record database 76. Thus, an operator may have the MEI receive a plurality of input data records and generate a plurality of links with a particular matching threshold level, as described below, being used. The operator may then decide to perform a second run through the data using a lower matching threshold level to produce more links, but does not want to delete the data records themselves, and does not want to delete the identity and non-identity rules from the rules database created during the first run through the data. Thus, the operator may delete the identity database, but keep the control databases, and in particular the rules database, for the second run through the data. Now, a method of adding or updating data in the master entity index in accordance with the invention will be described.

Figure 4:
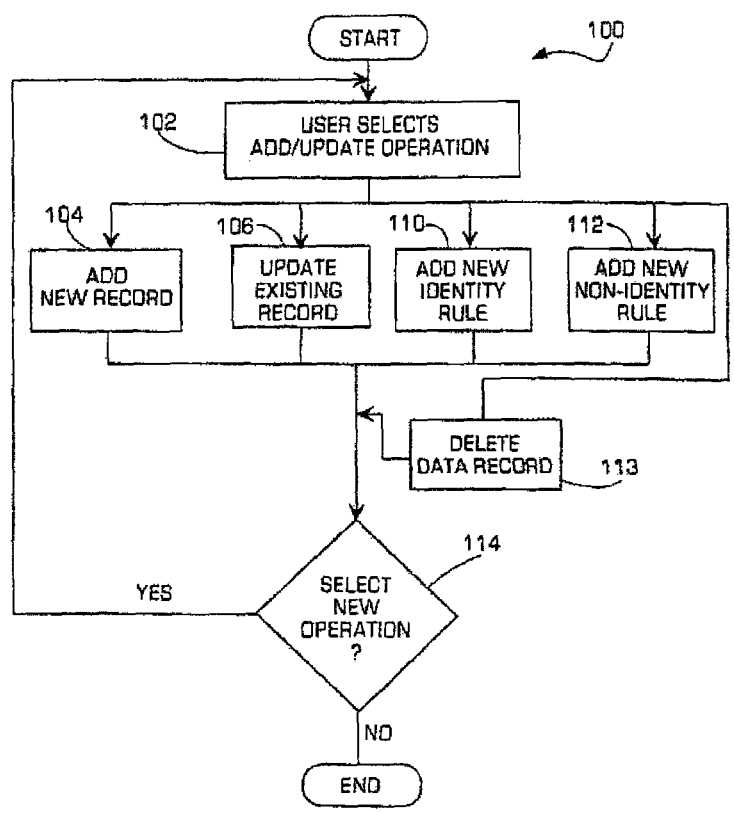
FIG. 4 is a flowchart illustrating a plurality of input operations that may be executed by the master entity index of FIG. 2.

FIG. 4 is a flowchart illustrating a method 100 for adding or updating data within the master entity index system. The user selects an add/update operation in step 102 which permits the user to select, for example, an add new data record operation 104, an update an existing data record operation 106, an add new identity rule 110, an add new non-identity rule 112, and a delete data record operation 113. The add new data record operation permits a user of the MEI to add a new data record containing information about an entity into the MEI while the update an existing data record operation permits a user of the system to update the data record or information about an entity that already exists within the MEI. The add identity and add non-identity rule operations permit the user to add identity or nonidentity rules into the rules database 80 shown in FIG. 3. The delete operation permits the user of the MEI to delete a data record from the data records database. Each of these operations will be described in more detail below with reference to FIGS. 7-12. The MEI may then determine whether there are additional addition or updating operations to perform in step 114 based on the user's response and either exit the method or return to step 102 so that the user may select another addition or updating operation. The add/update/delete operation may also be used for the control databases to add/update information in those databases, and additional processing may occur due to changes in the control databases which may change the identity database. In all of those cases, the additional processing is to identify the existing identity records that are impacted by the modification, and to use the match/link operation to re-compute the appropriate entries in the identity database. For example, removing a record for the anonymous name database would cause re-computation of identities of all records with that anonymous name, and all records linked to those records.

For all of the data records stored by the MEI, a record identifier may be used to uniquely identify the entity referred to by that record compared to other data records received from the data source. For example, in data records obtained from a hospital information system, an internally-generated patient identifier may be used as a record identifier, while in data records from a health plan membership database, a social security number can be used as a record identifier. A record identifier differs from an entity identifier because its scope is only the data records from a single data source. For example, if a person in a health plan is a patient in the hospital, their hospital record will have a different record identifier than their health plan record. Furthermore, if records from those two data sources happened to have the same record identifier, this would be no indication that the records referred to the same entity.

An additional aspect of the data record database is that one or more timestamps may be recorded along with the data record. The timestamps may indicate when the data record was last changed (e.g., when the data record is valid) and when the data record was received from the information source. The timestamps may be used to track changes in a data record which may indicate problems, such as fraud, to the operation of the MEI. The timestamps may be generated whenever a data record is added to the MEI or updated so that the historical changes in the data record may be documented. Additionally, individual attribute values may be associated with status descriptors that describe how the values should be used. For example, an attribute value with an "active" status would be used for identification, an attribute value with an "active/incorrect" status would be used for identification but not presented to the operator as being the correct value (for example, an old address that still occurs in some incoming data records), and a status of inactive/incorrect means that the value should no longer be used for matching but should be maintained to facilitate manual review. Now, a method for querying the MEI in accordance with the invention will be described.

Figure 5:
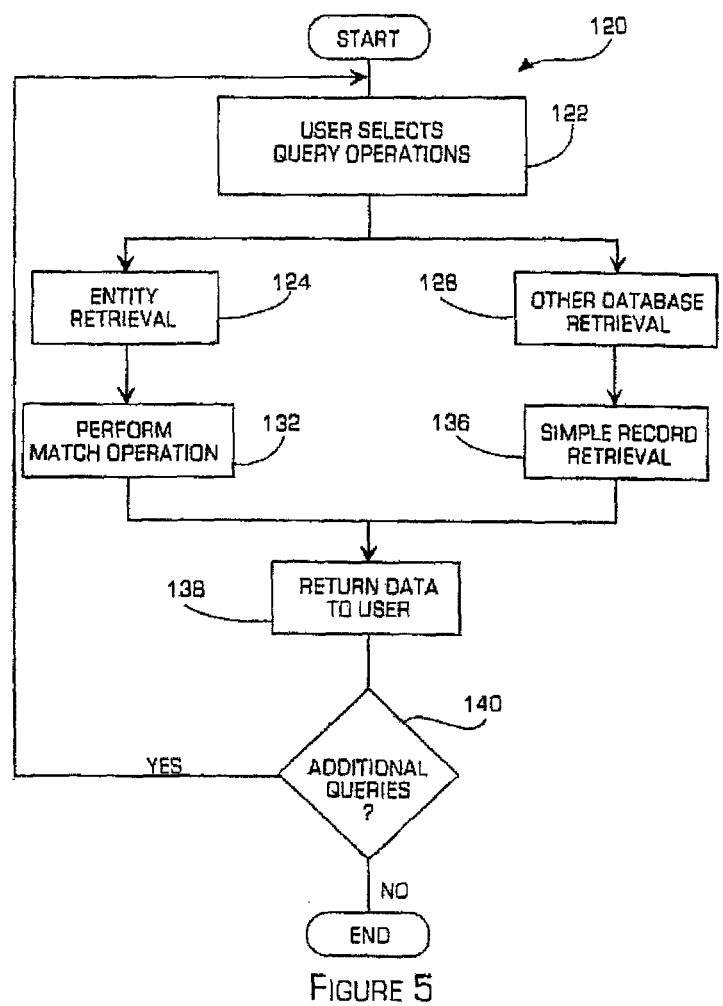
FIG. 5 is a flowchart illustrating a plurality of query operations that may be executed by the master entity index of FIG. 2.

FIG. 5 is a flowchart illustrating a method 120 for querying the master entity index in accordance with the invention. The querying operations permit the user to retrieve information from the MEI about a particular entity or data from one of the control databases. After a user selects the query operation in step 122, the user may select from a particular query operation that may include an entity retrieval operation 124, or a database query operation 128. For the entity retrieval operation, the MEI in step 132 may execute the match operation 300 described below. During the match operation, an input query may be matched against data records within the various information sources, as described in more detail below with reference to FIG. 15. For the database retrieval operation, the operator specifies a database and a set of attribute values that indicates the records of interest. The MEI in step 136 may locate those records in the specified database that has corresponding values for the specified attributes.

Additional queries may be performed by the MEI. The MEI may be queried about the number of entities in the MEI database and the MEI may respond with the number of entities in the MEI database. The MEI may also be queried about the volatility (e.g., the frequency that the data records change) of the data in the data records using a timestamp indicating the last time and number of times that the data has been changed that may be associated with each data record in the MEI. The volatility of the data may indicate fraud if the data about a particular entity is changing frequently. The MEI may also be queried about the past history of changes of the data in the data records so that, for example, the past addresses for a particular entity may be displayed. Once the queries or matches have been completed, the data is returned to the user in step 138. The MEI may then determine whether there are additional queries to be performed in step 140 and return to step 122 if additional queries are going to be conducted. If there are no additional queries, the method ends. Now, an exception processing method that may be executed by the MEI will be described.

Figure 6:
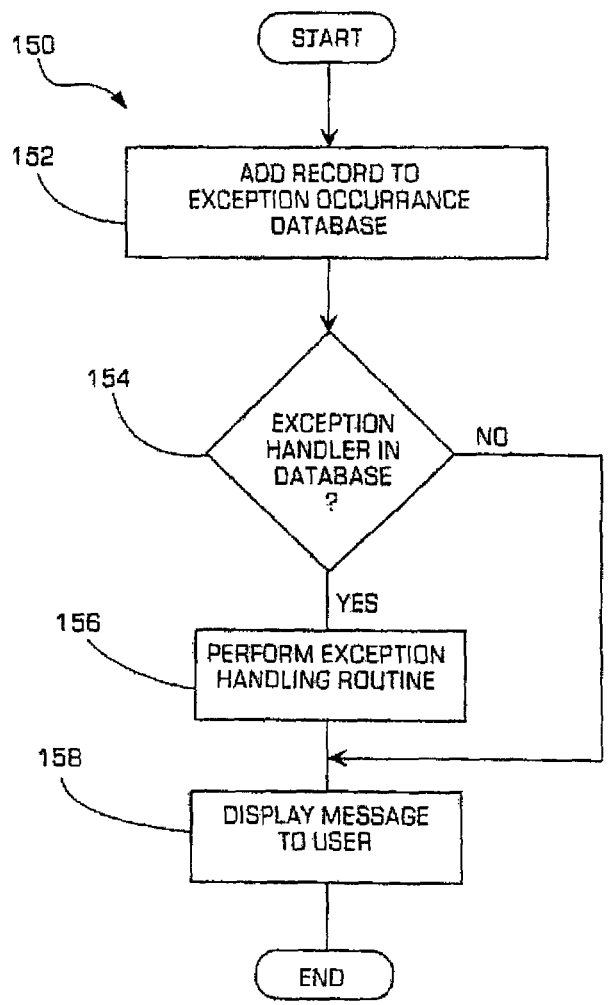
FIG. 6 is a flowchart illustrating a plurality of monitor operations that may be executed by the master entity index of FIG. 2 (where the plurality of operations is referred to as a whole as "exception processing")

FIG. 6 is a flowchart of a method for processing exceptions 150 that may be executed by the MEI. The input is data describing the occurrence of an exception, for example, an entity whose data records indicate two different values for the entity's sex. In step 152, the exception given as input to the operation is recorded in the exception occurrence database. In step 154, the MEI determines if there is an exception handling rule within the exception handling database 82 for handling the anomaly, as shown in FIG. 3 As described above, the exception handling database contains a plurality of rules for handling various types of exceptions. If an exception handling rule is in the exception handling database, in step 156, the MEI may perform the exception handling routine in the database. The routine may generate a message for the operator or may process the data using another software program. A message may be displayed to the user in step 158. If there was not an exception handling routine in the exception handling database, then a message is printed for the user in step 158. The message may require the user to perform some action or may just notify the operator of the action being taken by the MEI in response to an exception. After the message is displayed, the exception handling method has been completed. Now, the operations that may be performed by the MEI during the addition and updating data method will be described.

Figure 7:
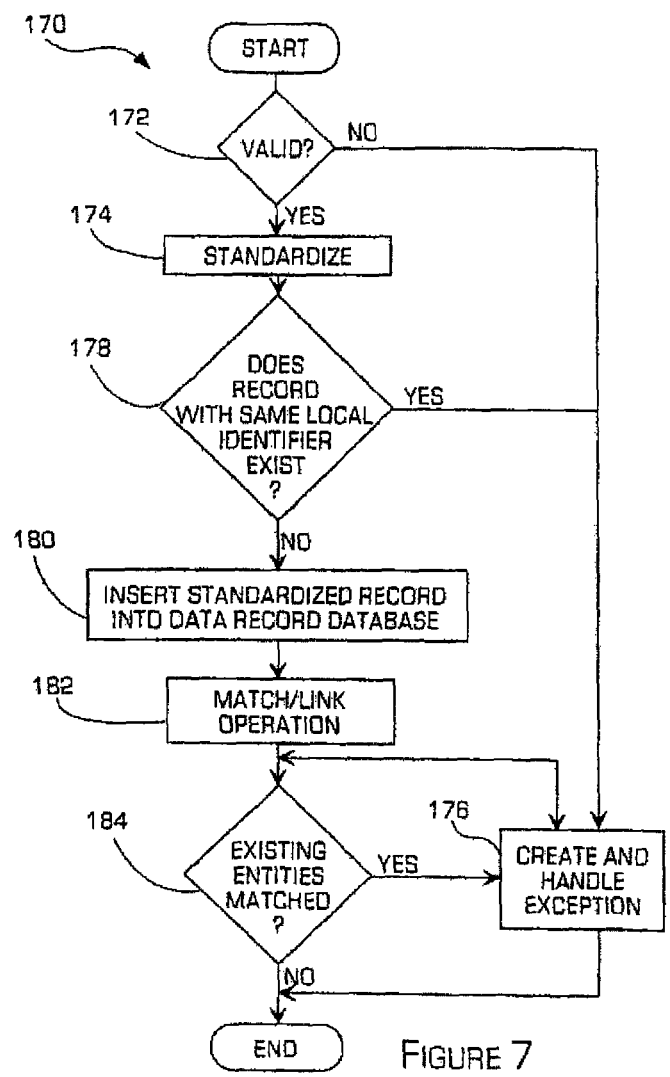
FIG. 7 is a flowchart illustrating a new data record addition operation that may be executed by the master entity index of FIG. 2.

FIG. 7 is a flowchart illustrating a method 170 for inserting a new data record into the MEI in accordance with the invention. The insertion of a new data record for a new entity usually occurs when a particular information source has determined that the new data record should not refer to the same entity as any other data record previously generated by the information source.

For inserting a new data record into the MEI, a record containing the new data is received by the MEI from the user. The MEI may then attempt to validate and standardize the fields in the new data record.

Validation in step 172 may include examining the lengths of the fields or the syntax or character format of the fields, for example, as numeric fields may be required to contain digits in specified formats. Validation may also involve validating codes in the new data record, for example, valid state abbreviations or diagnostic codes. Additional data sets may be involved in the validation process, for example, a data set containing valid customer account numbers. If the validation process fails, in step 176 an exception may be created that indicates that invalid data is received, the exception handling method described above may be performed, and processing of the insert new record operation is complete.

During standardization in step 174, the MEI may process the incoming data record to compute standard representations of certain data items. For example, the incoming data record may contain the first name of "Bill" and the MEI may add a matching field containing "William" into the incoming data record so that the MEI may match data records to William. This standardization prevents the MEI from missing data records due to, for example, nicknames of people. Other kinds of standardization may involve different coding systems for medical procedures or standard representation of street addresses and other geographic locations.

The MEI may then attempt in step 178 to determine if a data record with the same record identifier already exists in the data record database. If the standardized input data has the same record identifier as an existing data record, in step 176 an exception may be created that indicates that a two data records with the same record identifier have been received, the exception handling method described above may be performed, and processing of the insert new record operation is complete. If the standardized input data does not have the same record identifier as an existing data record, then the standardized input data may be added into the MEI and a timestamp may be added to the data record in step 180. Then in step 182, the match/link method 210 described below and summarized in FIG. 15 may be performed. The match/link operation is initiated using the standardized input data, and its execution makes the results of the match/link operation available to the insert new data record operation. Then in step 184, the MEI may determine if the match/link operation linked the standardized input data record with any other records from the same information source. If so, in step 176 an exception may be created that indicates that a duplicate data record has been received, the exception handling method described above may be performed, and processing of the insert new record operation is complete. If not, the results of the match/link operation are returned to the operator and the insert new data record operation has been completed. Now, a method for updating an existing data record already in the MEI will be described.

Figure 8:
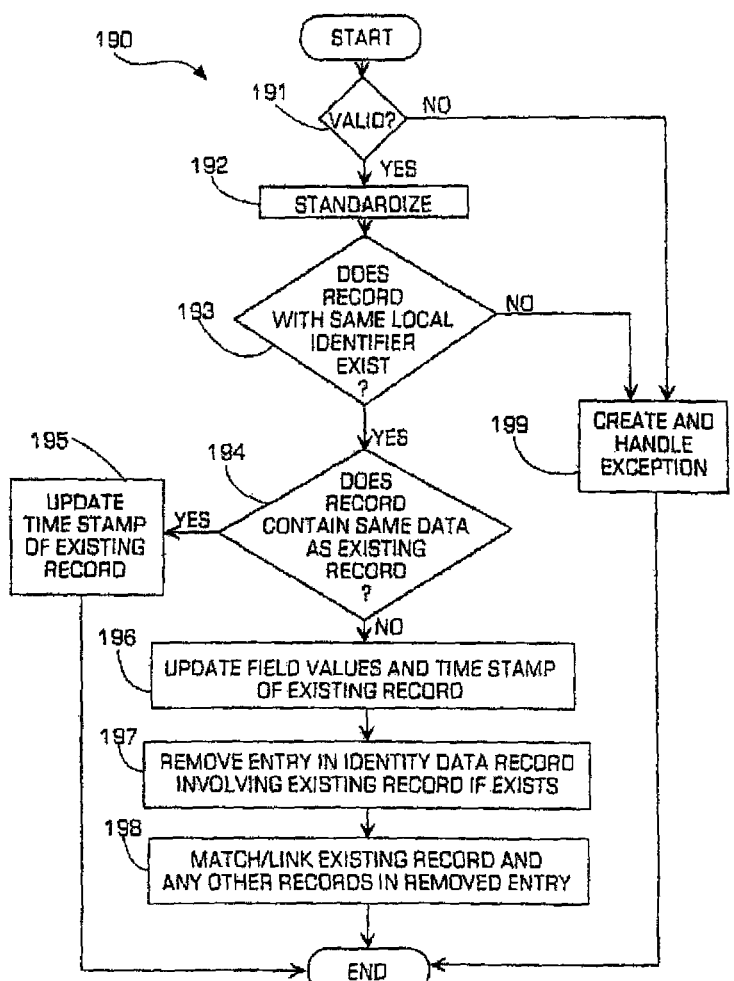
FIG. 8 is a flowchart illustrating an existing data record update operation that may be executed by the master entity index of FIG. 2.

FIG. 8 is a flowchart illustrating a method 190 for updating an existing data record containing information about a new or existing entity in accordance with the invention. Updates occur when an information source receives new information concerning an entity for which is already in its data store. The new information received by the information source will be communicated to the MEI through the update operation.

To perform the update method, the MEI may first test the input data for validity in step 191, using the same method as in step 172 of the add new record operation described in FIG. 7. If the validation process fails, in step 199 an exception may be created that indicates that invalid data is received, the exception handling method described above may be performed, and the processing of the update existing data record operation is complete. The MEI may then standardize the input data in step 192, using the same method as in step 174 of the add new record operation. The MEI may then attempt in step 193 to determine if a data record with the same record identifier as the standardized input data already exists in the data record database. If the standardized input data does not have the same record identifier as an existing data record, a new item may be added to the exception database in step 199 indicating that a duplicate data record was located, and no further processing is performed.

If the standardized input data does have the same record identifier as an existing data record, then the incoming data record is checked in step 193 to see if it contains exactly the same values for data fields as a data record already contained in the data record database. If the standardized input data does not have the same record identifier as an existing data record, in step 199 an exception may be created that indicates that a duplicate data record has been received, the exception handling method described above may be performed, and processing of the update existing data record operation is complete. If the standardized input data contains exactly the same values, then the execution of this operation cannot affect the identity database. As a result, the timestamp of the existing data record may be updated in step 195 to reflect the current time and processing of the operation is completed. If the standardized input data contains different field values than the existing record with the same record identifier, in step 196 the existing record's field values may be updated to be consistent with the values in the standardized input data, and its timestamp may be updated to reflect the current time. Since the data in the existing record has now changed, the impact on the identity database must be computed. To do this, the MEI in step 197 may first remove an entry in the identity database involving the existing record, if such an entry exists. The MEI may then perform a match/link operation in step 198 for the existing records and any other records referred to in the identity database record removed in step 197. These are the records that had been previously recorded in the identity database as referring to the same entity as the existing data record. The match/link operation performs as described in FIG. 9.

Once the match/link results have been returned in step 198 or the timestamp updated in step 195 or an exception has been generated in step 199, the add new data record operation has been completed. Now, a method for matching/linking a data record will be described.

Figure 9:
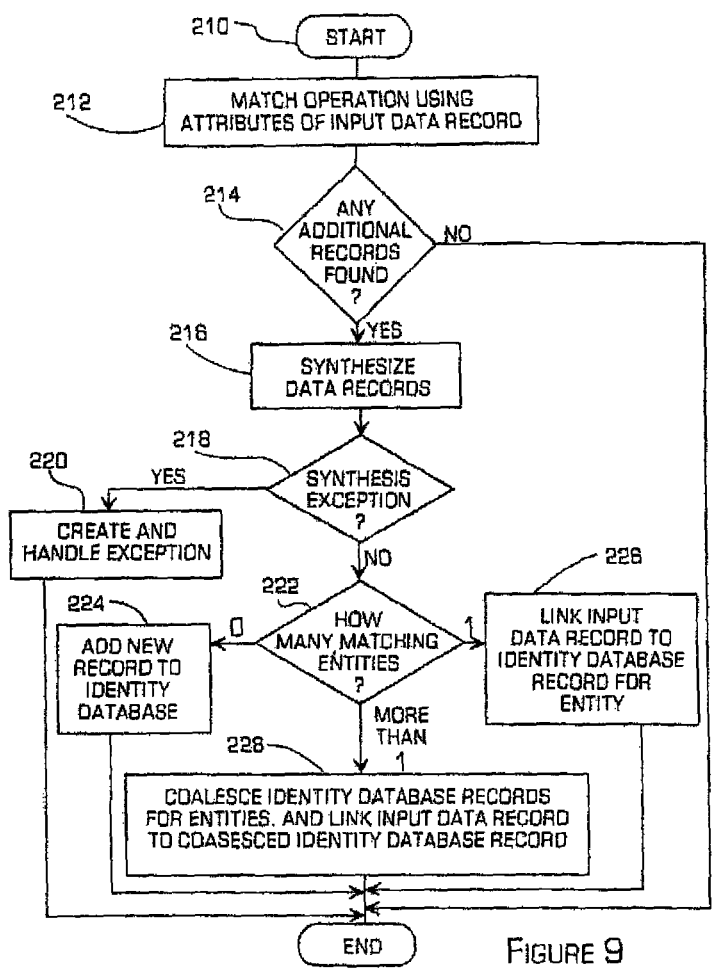
FIG. 9 is a flowchart illustrating the match/link operation that may be executed by the master entity index of FIG. 2.

FIG. 9 is a flowchart illustrating a method 210 for matching/linking a data record in accordance with the invention. This operation is used to determine the data records in the data record database that refer to the same entity as an input data record in the data record database.

To perform the match/link operation, in step 212, the MEI may perform the match operation 300 described below and diagrammed in FIG. 15. In this step, the data in the input data record is given to the match operation as its input, and the data records returned by the match operation are made available. The MEI may then in step 214 determine if any matching data records were made available. If no data records other than the input data record were returned, the match/link operation is completed. If at least one, other data record was returned, the incoming data record and matching data records may be synthesized in step 216. The synthesis process combines the data values in the new record and the existing records associated with the entities. The MEI may then in step 218 determine if a condition indicating a synthesis exception has occurred, as defined by the current contents of the exception database. For example, if the incoming data record lists the sex of the entity as male while one of the matching data records lists the sex of the entity as female, and the exception database states that coalescing records with different sexes is an exceptional condition, an exceptional condition will be identified. If an exception occurs, in step 220 the MEI may create and handle the appropriate synthesis exception and the processing of the match/link operation is complete. If there are no synthesis exceptions, then in step 222, the MEI may determine the number of identity records currently held in the identity database that link data records which match the input data record. If no identity records exist, in step 224, a record may be added to the identity database with a new unique base part and a version number of 0. If exactly one identity record exists, in step 226 the MEI may update this record to add a link to the input data record. If more than one identity record exists, the MEI in step 228 may "coalesce" these records— that is, remove the existing identity records and replaces them with a single identity record linking the input data records with all the data records returned in step 212. After one of steps 224, 226, and 228 are performed, the processing of the match/link operation has been completed. Now, a method for adding an identity rule in accordance with the invention will be described.

Figure 10:
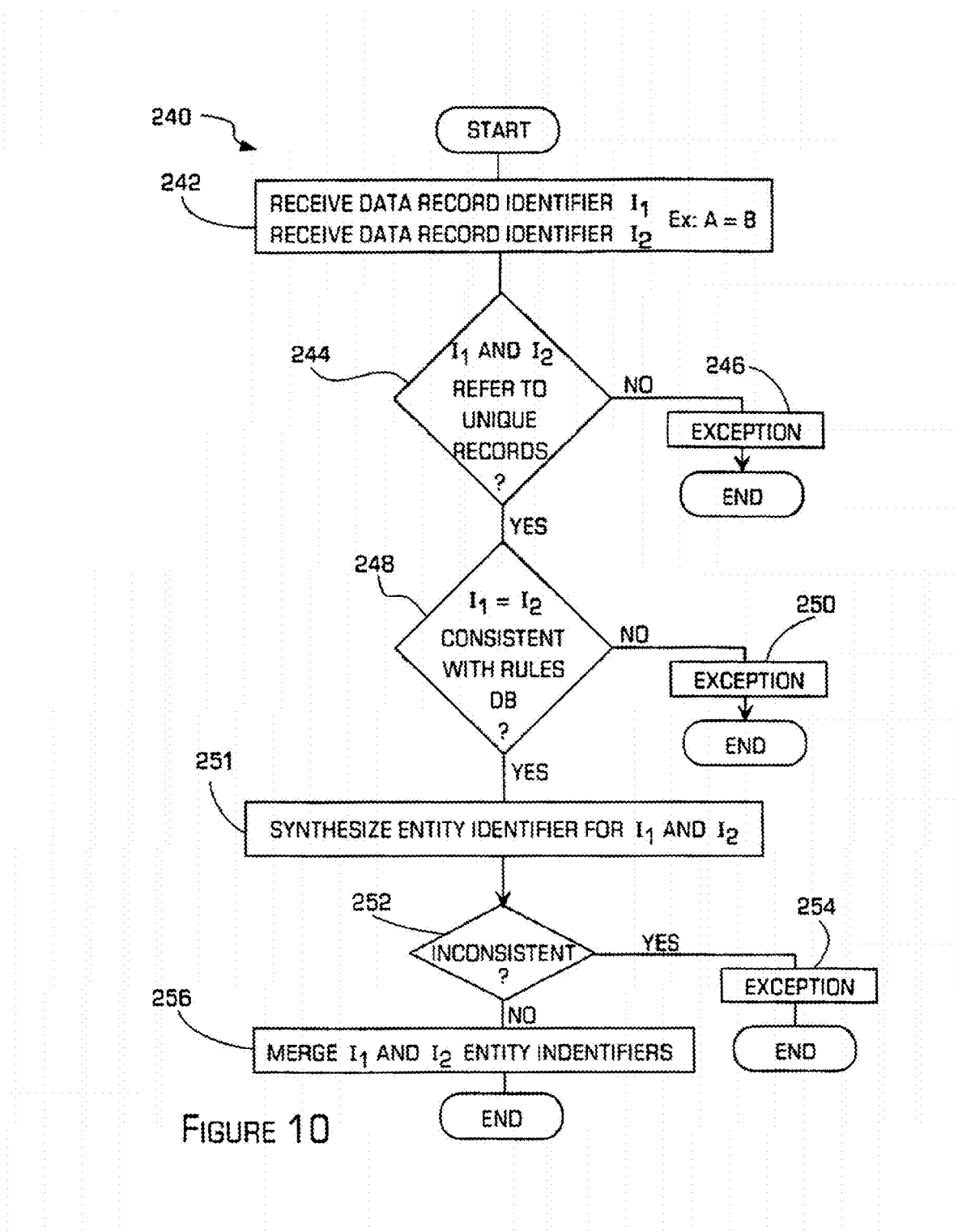
FIG. 10 is a flowchart illustrating an identity rule operation that may be executed by the master entity index of FIG. 2.

FIG. 10 is a flowchart illustrating a method 240 for adding an identity rule to the rules database of the MEI in accordance with the invention. In step 242, the MEI may receive two data record identifiers, I.subtext.1 and I.subtext.2. In this example, the identity rule is I.subtext.1=I.subtext.2 which means that these two data records contain information about the same entity. The MEI may then determine if the two identifiers refer to separate unique records in step 244 and an exception routine may be executed in step 246 if an exception occurs. If there is no exception, the MEI determines if the new identity rule is consistent with the rules already contained in the rules database in step 248. If there is an exception, such as the rules database has a non-identity rule that specifies that I.subtext.1 and I.subtext.2 are not associated with each other, an exception routine is executed in step 250. If the new identity rule is consistent with the other rules in the rules database, then the entity identifier containing the two data records are synthesized in step 251 to determine if there are any inconsistencies within the associations of the two entity identifier as shown in step 252. If there are any inconsistencies in the entity identifier, an exception handling routine is executed in step 254. Otherwise, the entity identifier containing the two data records are merged together in step 256 and the method is completed. Now, a method of adding a non-identity rule to the rules database in accordance with the invention will be described.

Figure 11:
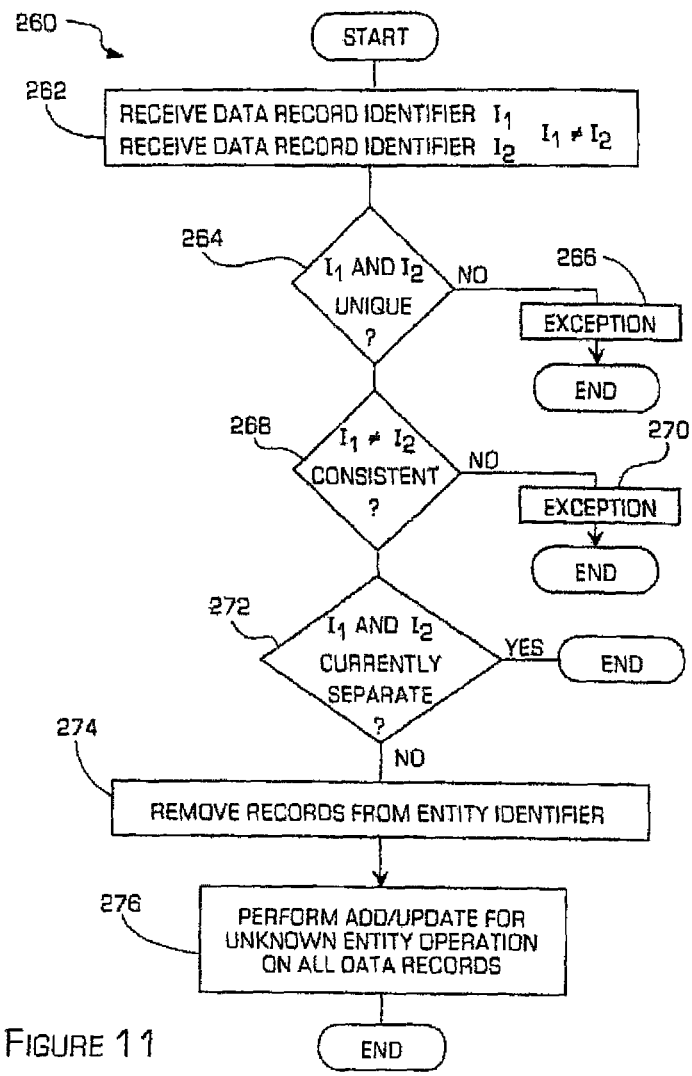
FIG. 11 is a flowchart illustrating a non-identity rule operation that may be executed by the master entity index of FIG. 2.

FIG. 11 is a flowchart illustrating a method 260 for adding a non-identity rule to the rules database of the MEI in accordance with the invention. In step 262, the MEI may receive two data record identifiers, I.subtext.1 and I.subtext.2. In this example, the non-identity rule is I.subtext.1.notequal.I.sub.2 which means that these two data records contain information that is not about the same entity. The MEI may then determine if the two identifiers refer to separate unique records in step 264 and an exception routine may be executed in step 266 if an exception occurs. If there is no exception, the MEI determines if the new non-identity rule is consistent with the rules already contained in the rules database in step 268. If the new non-identity rule conflicts with one of the existing rules in the rules database, an exception occurs in step 270. If the new non-identify rule does not conflict, then the MEI determines whether the two data records corresponding to the identifiers are currently located in different entity identifier in step 272. If the data records are already separated, then the method ends. If the data records are not currently in different entity identifiers, then in step 274 the data records identified by I.subtext.1 and I.subtext.2 as well as the other data records are removed from the entity identifier containing the data records identified by I.subtext.1 and I.subtext.2 Then, in step 276, the match/link operation, as described above, is performed on each data record removed from the entity identifier. The match/link operation may re-associate those data records previously in the entity identifier with other data records or reestablish the entity identifier without either I.subtext.1 or I.subtext.2. Now, a method for deleting data records in accordance with the invention will be described.

Figure 12:
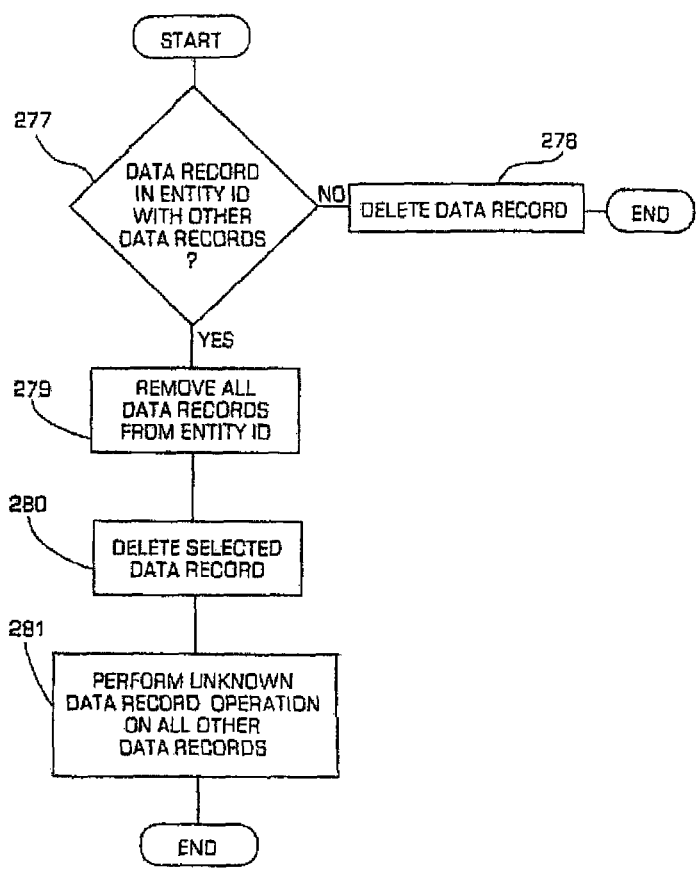
FIG. 12 is a flowchart illustrating a delete operation that may be executed by the master entity index of FIG. 2.

FIG. 12 is a flowchart illustrating a method for deleting a data record in accordance with the invention. In step 277, the MEI determines if the data record to be deleted is located within an entity identifier with other data records. If there are no other data records in the entity identifier, then in step 278, the data record may be deleted and the method is completed. If there are other data records associated with the data record to be deleted, then in step 279, all of the data records are removed from the entity identifier, and in step 280, the selected data record may be deleted. Then in step 281, a match/link operation, as described above, is executed for the other data records previously in the entity identifier. The match/link operation may re-associate those data records previously in the entity identifier with other data records or reestablish the entity identifier without the deleted data records. Now, a method for querying the MEI for data records and querying the MEI for information from the other control databases will be described.

Figure 13:
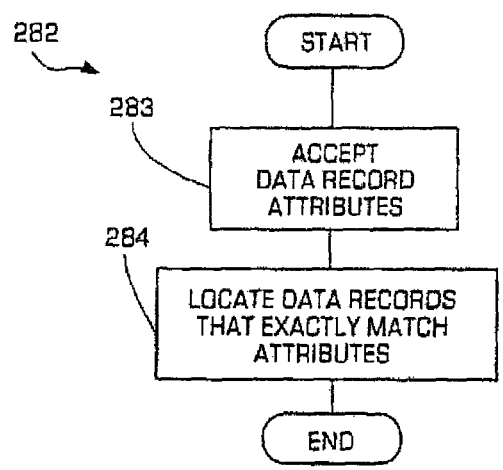
FIG. 13 is a flowchart illustrating a data record retrieval operation that may be executed by the master entity index of FIG. 2.

FIG. 13 is a flowchart illustrating a method 282 for querying the MEI system for data records about a particular entity. In step 283, the MEI accepts a query from the user that contains entity attributes. These attributes correspond to data fields within the data records stored by the MEI. In step 284, the MEI retrieves data records which have data fields that match the attributes provided in the query and displays those located data records for the user. The details of the matching method will be described below in method 300 and illustrated in FIG. 15.

Figure 14:
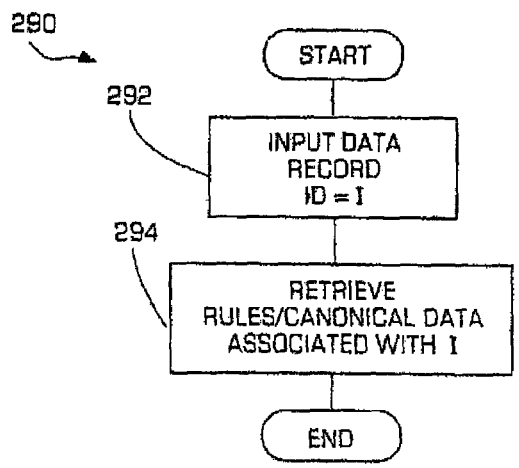
FIG. 14 is a flowchart illustrating a database retrieval operation that may be executed by the master entity index of FIG. 2.

FIG. 14 is a flowchart illustrating a method 290 for querying the MEI to locate information in the databases of the MEI. In step 292, the operator may input a database and values for fields maintained in records of the database. In step 294, the MEI may retrieve any information from the control databases relating to the data record identifier I. For example, if the user queries the MEI about rules in the rules database containing identifier I, the MEI may return the identity rule I=M and the non-identity rule I.notequal.N. Now, a method for computing the match operation data records in the MEI database based on a set of query attributes will now be described.

Figure 15:
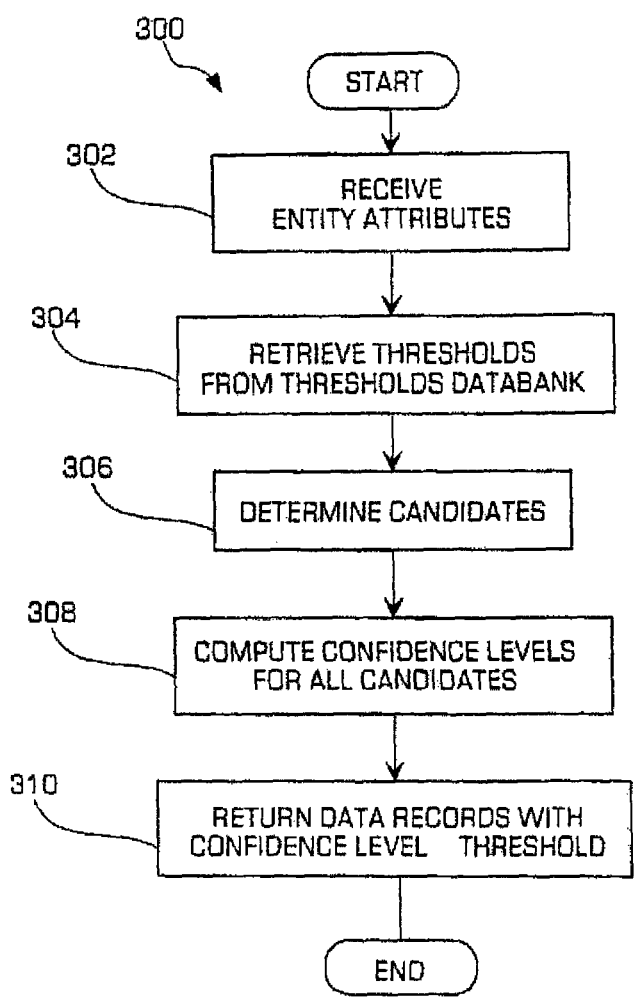
FIG. 15 is a flowchart illustrating a match operation that may be executed by the master entity index of FIG. 2.

FIG. 15 is a flowchart illustrating a method 300 for finding matching data records in the MEI database based on a set of query attributes in accordance with the invention. In step 302, the MEI accepts a query in the form of a list of entity attributes and associated values. Examples of entity attributes in a health care example could be patient number, first name, last name, or phone number, or if the database is a parts inventory, the part number, or the manufacturer for the part. In step 304, the threshold being used by the matching operation may be retrieved from the thresholds database shown in FIG. 3. As described above, the thresholds database permits different threshold levels to be used depending on how close a match is desired by the operator.

Once the threshold has been set, in step 306, a plurality of candidates may be retrieved. To select the candidates, the input attributes are divided into combinations of attributes, such as the last name and phone number of the patient, the first name and last name of a patient, and the first name and phone number of the patient. The data records in the MEI database are exactly matched against each combination of attributes to generate a plurality of candidate data records. Determining candidates from several combinations of attributes permits more fault tolerance because a data record may have a misspelled last name, but will still be a candidate because the combination of the first name and the phone number will locate the data record. Thus, a misspelling of one attribute will not prevent the data record from being a candidate. Once the group of candidates has been determined, the confidence level for each candidate data record may be calculated.

The confidence level may be calculated based on a scoring routine, which may use historical data about a particular attribute, such as a last address. Thus, if the current address and past addresses match a query, the confidence level is higher than that for a data record with the same current address but a different old address. The scoring routine may also give a higher confidence level to information more likely to indicate the same entity, such as a social security number. The scoring routine may add the confidence level for each attribute to generate a confidence level value for a candidate record (match score). Once the confidence levels have been calculated, any data records with confidence levels higher than the threshold level are displayed for the user in step 310. The method of matching attributes to data records within the MEI database has been completed.

As mentioned above, data records may also be in hierarchical relationships with one another. These hierarchical relationship may or may not be determined by the MEI system 30 and may be provided by information sources 34, 36, 38 and denote the relationships between data records provided by that, or another, information source 34, 36, 38. Examples of such information sources that comprise data records and explicit hierarchical relationships among those data records (e.g., parent-subsidiary corporations, etc.) are Dun and Bradstreet, Experian, Acxiom, InfoUSA, etc. Alternatively, these hierarchical relationships may be asserted explicitly (e.g., defined) between two or more data records in the MEI database either automatically or through user input from an operator 40, 42, 44 for almost any reason, such as specialized knowledge, processing by a sales territory management billing application, etc.

In any event, it is desirable to associate incoming data records from an information source with existing data records and integrating these incoming data records with existing data hierarchies to which the existing data records belong. Incoming data records may also belong to incoming data hierarchies (e.g. data hierarchies specified by external sources), therefore it is also desirable to match the incoming data records with existing data records and reconcile the existing data hierarchies to which the existing data records belong with the incoming data hierarchies to which the incoming data records belong.

To that end, attention is now directed to systems and methods for indexing, associating or compositing data records and hierarchies from various information sources. Embodiments of the present invention may provide the ability to link data records and thus to link data records to known hierarchies of data records. More specifically, embodiments of the present invention may provide the capability to link data records in varying information sources and to thereby link an incoming data record with existing data records or existing data hierarchies such that an incoming data record may be linked to an existing data record which comprising information about the same entity (an identity link) or linked to other members of the data hierarchy (referred to as hierarchy links). In addition to identically linking an incoming data record with an existing data record and incorporating the incoming data record into an existing data hierarchy, embodiments of the present invention may provide the capability of reconciling an incoming data hierarchy to which an incoming data record belongs with an existing data hierarchy belongs such that the two data hierarchies may be composited.

Part and parcel with the above capabilities, embodiments of the present invention may provide the ability to correctly and properly identify an entity corresponding to a data record to locate all data records relating to the entity or to locate all data records hierarchically related to an entity. The master entity index system may process incoming data records and compare them to data records existing in the master entity index to locate data records containing information about the same entity. The matching operation may use one or more combinations of attributes to retrieve a plurality of candidate data records, generate a confidence level or match score for each candidate and only return data records or associated hierarchy structures to the user which have confidence levels greater than or equal to a configurable threshold level or that have been specified as identical in a rule database. The threshold level may be adjusted and the retrieval of the candidates may use historical data about an entity during the query. Based upon this confidence level, an incoming data record may be associated with an existing data record (e.g., the two records identity linked), the incoming data record may be linked with an existing data hierarchy to which the existing data record belongs (e.g., the incoming data record identically or hierarchically linked with a data record in an existing data hierarchy) or an incoming data hierarchy reconciled or composited with an existing data hierarchy.

The one or more information sources may be, for example, different databases that possibly have data records about the same entities. For example, in the manufacturing industry, each information source may be associated with different sub-assemblies, and an external information source may provide a supplier business hierarchy. The manufacturing organization may use the master entity index system to relate purchased parts from vendors to each other and to a business hierarchy. In this way, reports could be generated detailing inventory of parts purchased from a particular parent company. These information sources may be designated as primary, secondary, tertiary, etc. such that data records or data hierarchies received from various information sources may be compared based on these precedence designations (i.e., in case of disagreement, which source takes precedence over others).

To store data related to the data records and hierarchical structures the entity database of the master entity index system may comprise a link database for storing identity and hierarchy links between data records. Thus, the storage of data records may be separate from the storage of the links between the data records, making the master entity index system more flexible. The one or more control databases may permit the operator of the master entity index to customize the operation of the master entity index or to manually create and modify hierarchy structures.

Figure 16A:
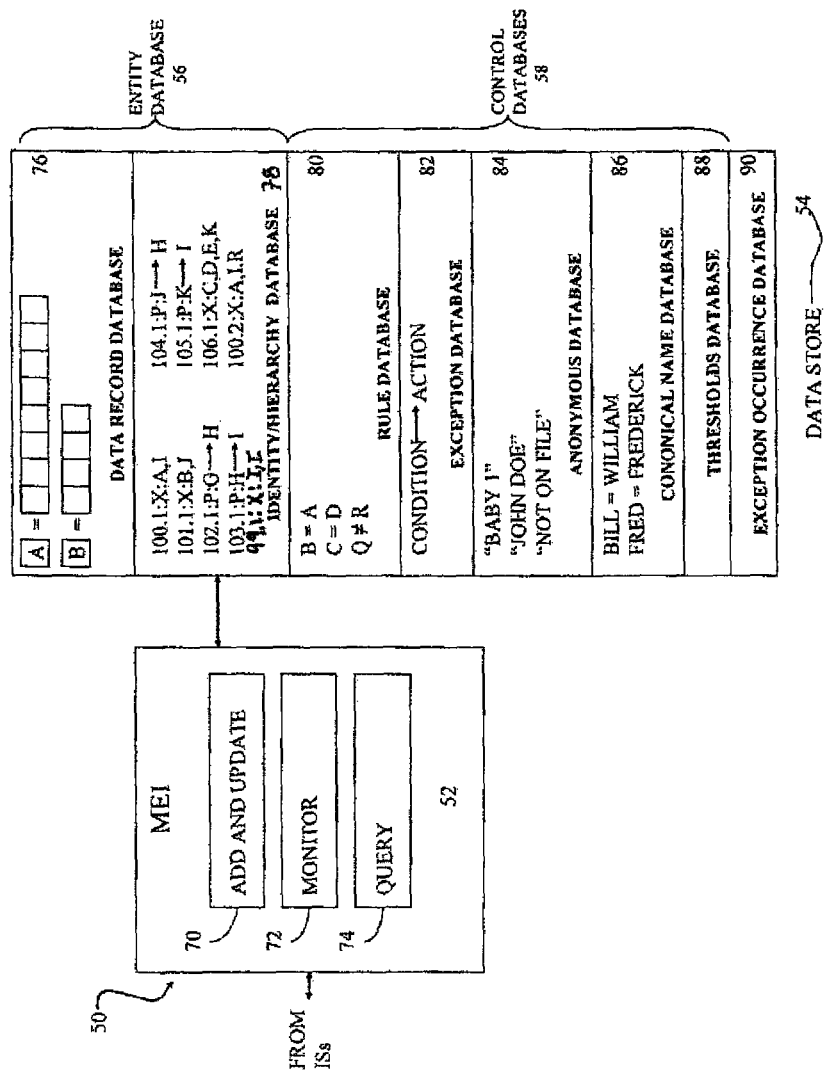

Turning to FIG. 16A, a depiction of an embodiment of a master entity index system 50 where the entity database 56 of MEI 52 includes identity/hierarchy database 78 operable to store both identity links between data records and hierarchy links between data records. The master entity index system 30 may link data records containing information about the same entity (e.g., an identity link) so that a search for that particular entity will retrieve all the member data records that are linked together. The master entity index system may also link data records in a variety of data hierarchies (hierarchically link) so that a retrieval of a particular data record or entity will retrieve all or a subset of a data hierarchy (e.g. a set of entities, themselves comprising a set of data records, where the data records or entities are directly or indirectly (inferred) hierarchically linked to one another) to which that data record or entity belongs, with or without identically linked data records for each node in the hierarchy.

More particularly, in one embodiment, the identity/hierarchy database 78 may store a group of data record identifiers that associate or "link" those data records which contain information about the same entity (identity link) and/or are hierarchically related (hierarchy link). The identity/hierarchy database 78 represents the combination of data records in the data record database that refer to the same entity, and/or belong to the same hierarchy. Each entity is assigned an entity identifier, and has link type of "X" meaning identity link or a link type of "P" indicating a hierarchy link. Entity identifiers are based on the concept of "versioned" identification. An entity identifier consists of a base part and a version number. The base part represents a specific individual about whom information is being linked. The version number represents a specific combination of data records that provides information about the entity that is known at a specific time. In this example, the data records are shown as letters, and the entity identifier is shown as the base part followed by a period followed by a version number followed by a link type of 'X'. For example, "100.1:X" indicates an entity identifier with 100 as the base part and 1 as the version number and of X link type. Similarly, hierarchy information is shown as the base part followed by a period followed by a version number followed by a link type of "P". For example, "102.1:P indicates an entity identifier with 102 as the base part, 1 as the version number and a link type of P.

Referring specifically to FIG. 16A: entity identifier 99.1:X links data records I and I (a self-identify link), entity identifier 100.1:X links data records A and I, entity identifier 101.1:X links data records B and J, entity identifier 106.1:X links data records C, D, E and K, "102.1: P" indicates data record G is parented by data record H, "103.1:P" indicates data record H is parented by data record I, "104.1:P" indicates data record J is parented by data record H, and "105.1:P" indicates data record K is parented by data record I.

Figure 17A:
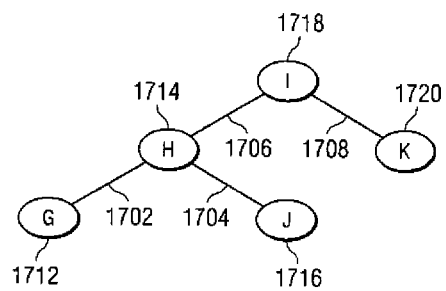
FIGS. 17A, 17B, 17C and 18 are graphical representation of example hierarchies of data records.

Graphically, the data hierarchy represented by the explicit hierarchy links of the above example may be depicted as a tree structure, as shown in FIG. 17A. More particularly, link 1702 represents "102.1:P" indicating data record G 1712 parented by data record H 1714, link 1704 represents "104.1:P" indicating data record J 1716 parented by data record H 1714, link 1706 represents "103.1:P" indicating data record H 1714 parented by data record I 1718 and link 1708 represents "105.1:P" indicating data record K 1720 parented by data record I 1716.

Though data records may not be explicitly hierarchically linked in identity/hierarchy database 78 (e.g., linked by a P type link), data records may be inferred hierarchically linked by virtue of the fact that they are identically linked (e.g., X type link) with one or more data records which are hierarchically linked. In other words, when it has been determined that two data records represent the same entity (e.g., matched or associated as described above), every data record associated with that entity is deemed to be in the same hierarchical relationship with other entities or data records.

These concepts may be better explained with reference to the example denoted in FIGS. 16A and 17A. Note that data record "A" is not explicitly hierarchically linked to any other data record in identity/hierarchy database 78, in other words there is no P type link between data record "A" and any other data record in identity/hierarchy database 78. Note additionally, however, that data record "A" is identically related (X type link) to data record "I" (e.g., data record "A" and "I" have been determined to represent the same entity). Because of the identity link between data record "A" and data record "I" (e.g., data record "I" has been matched to data record "I"), data record "A" may be inferred hierarchically related to the same data records to which data record "I" is hierarchically related (both explicitly and inferred). Thus, A may be inferred hierarchically related to data records H and K (i.e., the parent of both) through its identity link with data record "I".

In one embodiment, if an identity link is formed between a first and a second data record, and a hierarchy link indicates that the first data record is in the lower position of a data hierarchy with respect to a third data record (e.g., the first data record is parented by the third data record), the second data record cannot be hierarchically linked to any other data records (e.g., the second data record cannot be parented by any other data records as it is transitively linked to the third data record through its identity link with the second data record).

Figure 18:
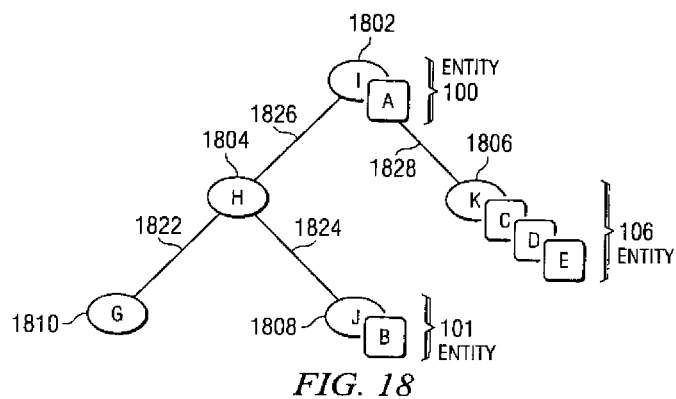

The above descriptions may be further elucidated upon with reference to FIG. 18 which graphically depicts both the explicit links of the example links contained in identity/hierarchy database 78 and the inferred hierarchy links that result from the identity links of identity/hierarchy database 78. Node 1802 comprises entity "100" comprising data record "I" and data record "A" (i.e., "100.1:X" linking data records A and I), node 1804 comprises entity "H", node 1806 comprising entity 106 (i.e., "106.1:X" linking data records C, D, E and K), node 1808 comprises entity 101 (i.e., "101.1:X" linking data records B and J"), and node 1810 comprises data record "G".

Link 1822 represents "102.1:P" indicating data record G is parented by data record H, link 1824 represents "104.1:P" indicating data record J is parented by data record H, link 1826 represents "103.1:P" indicating data record H is parented by data record I and link 1828 represents "105.1:P" indicating data record K is parented by data record I. Note that because many of the data records referenced by these links are associated with an entity (e.g., linked with other data records); these explicit hierarchy links imply a number of inferred hierarchy links. For example, "105.1:P" indicating data record K is parented by data record I, means that every data record associated with entity "106" to which data record "K" belongs (represented by node 1806), namely data records "C", "D", "E" and "K" is hierarchically linked to (parented by) every data record belonging to entity "100" to which data record "I" belongs, namely data records "A" and "I". Thought of another way, the entities may be hierarchically related to one another (e.g. members of each entity may be hierarchically linked to one another) such that every data record which is a member of one entity is hierarchically related in the same way to the data records of the other entity.

Thus, if an incoming data record is linked to an existing data record, that data record will be linked to the same entity as the existing data record and thus be inferred hierarchically linked to the same entities as those existing data records. Additionally, if the existing data record has a hierarchy link where it is in the lower position (e.g. parented by another data record/the child of another data record) the incoming matching data record may not have a hierarchy link formed where it is in the inferior position (e.g., may not be parented by any other data record). For example, data records "C", "D" and "E" may not be hierarchically linked to any other data record where the other data record is in a superior position (e.g., data records "C", "D" and "E" may not be parented by any other data records as they are inferred to be parented thorough their respective identity links with data record "K").

Figure 16B:
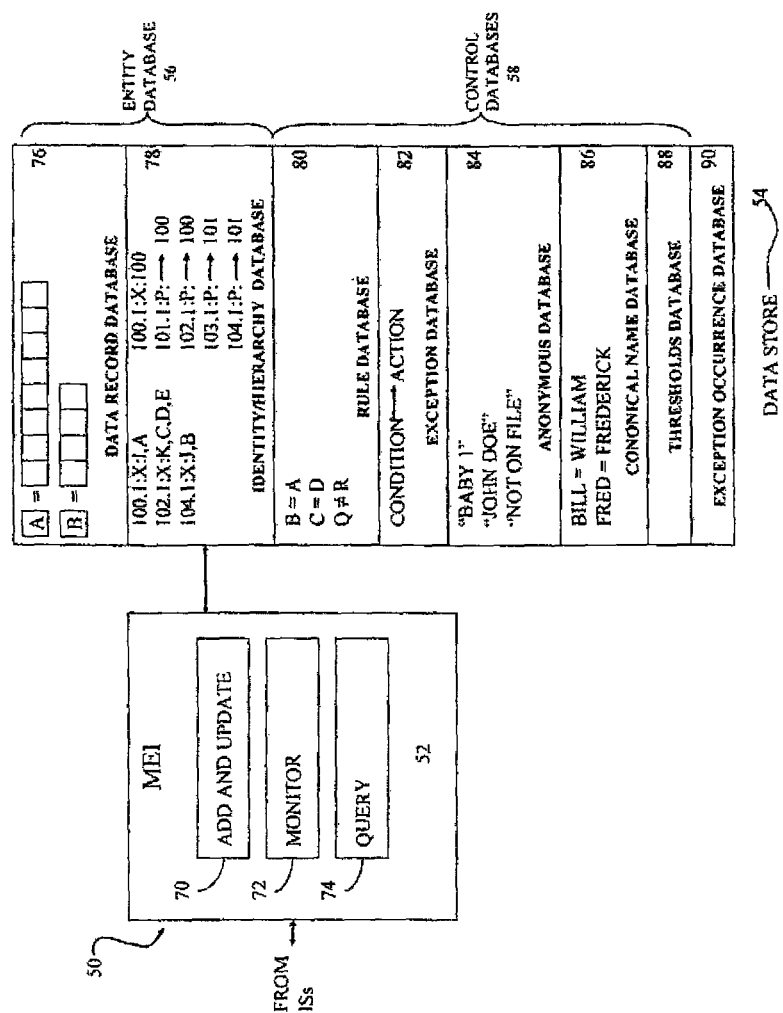

Other embodiments of identity/hierarchy database 78 may store identity links and hierarchy links in other manners. Referring to FIG. 16B, another embodiment of a master entity index system 50, where the entity database 56 of MEI 52 includes identity/hierarchy database 78 operable to store both identity links between data records and hierarchy links between entities, is depicted. The master entity index system 50 may link data records containing information about the same entity (e.g., an identity link) so that a search for that particular entity will retrieve all the member data records that are linked together. The master entity index system 50 may also link entities in a variety of data hierarchies (hierarchically link) so that a retrieval of a particular entity will retrieve all or a subset of a data hierarchy (e.g., a set of data records that are directly or inferred hierarchically linked to one another) to which that entity belongs.

More particularly, in one embodiment, the identity/hierarchy database 78 may store a group of identifiers that associate or "link" those data records which contain information about the same entity (identity link) and/or are hierarchically related (hierarchy link). In one embodiment a data hierarchy may comprise a set of nodes associated with entities, one of the nodes being a root node, where each node can have at most one parent and zero to many children, each node (e.g., corresponding to an entity) may itself be associated with zero or more data records. In this example, the data records are represented as an alphabetic identifier and the entity identifier is shown as the base part followed by a period followed by a version number followed by a link type of "X". For example, "100.1:X" indicates an entity identifier with 100 as the base part and 1 as the version number and X link type. Similarly, hierarchy information is shown as the base part followed by a period followed by a version number followed by a link type of "P". For example, "102.1:P" indicates an entity identifier with 102 as the base part, 1 as the version number and a link type of P.

Referring specifically to FIG. 16B: entity identifier "100.1:X" identity links data records I and A, entity identifier "102.1:X" identity links data records K, C, D and E, entity identifier "104.1:X" identity links data records B and J, entity identifier "100.1:X:100" links entity 100 with itself (a self-identity link designating a root node of a hierarchy), "101.1:P" indicates node (entity) 101 is parented by node (entity) 100, "102.1:P" indicates node 102 is parented by node 100, "1103.1:P" indicates node 103 is parented by node 101, and "104.1:P" indicates that node 104 is parented by node 101.

Figure 17B:
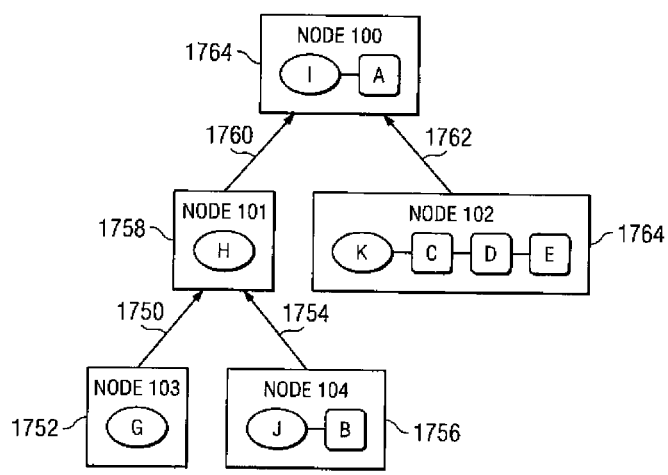

Graphically, the data hierarchies represented by the explicit hierarchy link of the above example may be depicted as a tree structure shown in FIG. 17B. More particularly, link 1750 represents "103.1:P" indicating node 1752 corresponding to entity 103 (comprising data record G, not shown in FIG. 16B) parented by node 1758 corresponding to entity 101, link 1754 represents "104.1:P" indicating node 1756 corresponding to entity 104 (i.e., data records J and B represented by "104.1:X" link) parented by node 101 1758, link 1760 represents "101.1:P" indicating node 1758 corresponding to entity 101 (e.g. comprising data record H) parented by node 1764 corresponding to entity 100 (comprising data records I and A) and link 1762 represents "102.1:P" indicating node 1764 corresponding to entity 102 parented by node 1764 corresponding to entity 100.

After the above discussion it may be realized that data records may come from information sources 34, 36, 38 in a variety of formats, may comprise a variety of different information regarding an entity, etc. Thus, it may be desired to create a standardized form of data record such that these data records may comprise a uniform set of attributes in a uniform format which correspond to an associated entity such that a user or operator can manipulate or manage a data hierarchy, protect a data hierarchy from change or alter relationships between entities without altering data records from various external data sources. In one embodiment, this standardized data record may be a master organizational solution such as a standard out of the box customer relationship management (CRM) solution or may be a proprietary standard format.

By utilizing standard data record formats the state of a data hierarchy at a particular time may be utilized to create a master data record for each of the entities in the data hierarchy, where the master data record for an entity may be a composite of attributes of one or more of the set of data records associated with the entity created using a set of rules for compositing the data records, where the rules may take into account the precedence level (e.g. primary, secondary, tertiary, etc.) of the source of each of the set of data records. These master data records may be maintained by MEI system 30 and linked with the entities from which they were created. Thus, these master data records may similarly be integrated into the data hierarchy utilized to create the master data records. These master data records may be updated in accordance with updating or alteration to the set of data records from which they are created. For example, if an attribute of a data record of the set of data records used to create the master data record changes, the attribute may change with respect to the master data record. The updating or changing of master data records may also be accomplished in conjunction with a level of precedence of a data source associated with a data record. For example, if a changed data record is associated with a primary source the master data record may be updated, while if it is from a secondary source the master data record may not be updated.

By the same token, by creating master data records for each of the entities in a data hierarchy a "snapshot" of a data hierarchy may be created and recorded. That is, information of the various data records associated with a data hierarchy at a particular time in time may be captured in the master entity records and these master entity records frozen or stored such that the state of the data hierarchy at that particular time may be accessed or referred to at a later time. Similarly, by freezing a master data record changes to any data records of the set of data records used to create the master data record (for example by the information source from which they originate) may be ignored, suspended, or promote follow-up review and resolution.

Figure 17C:
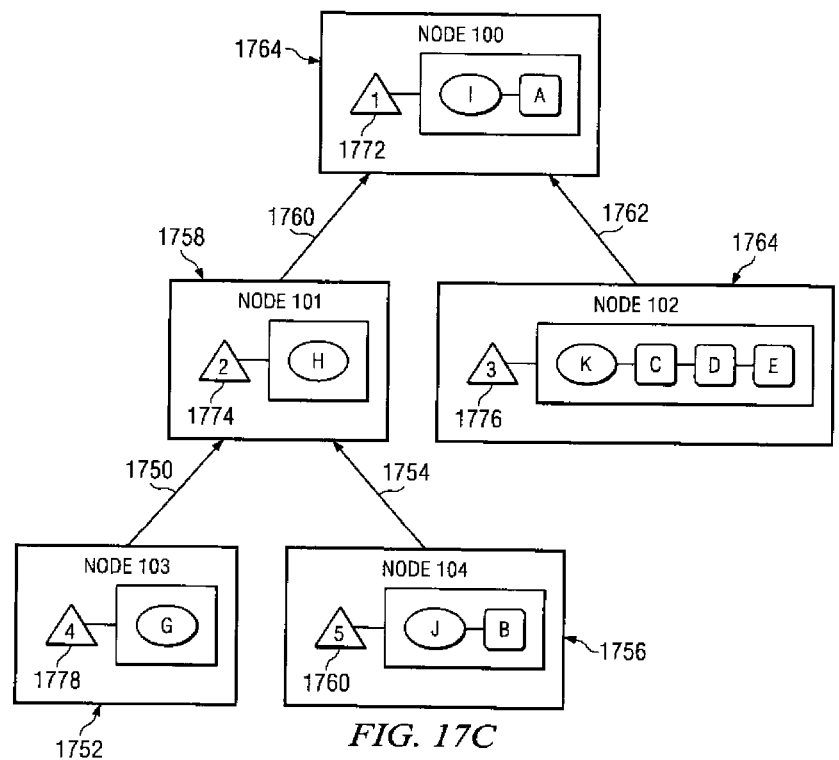

The creation of master data records may be better explained with reference to FIG. 17C which depicts one embodiment of a master data hierarchy created from the data hierarchy depicted in FIG. 17B. More particularly, master data record "1" 1772 is a composite of data record "I" and data record "A" of node 1764 corresponding to entity 100, master data record "2" 1774 is a composite of data record "H" of node 1758 corresponding to entity 101 master data record "3" 1776 is a composite of data record "K", data record "C", data record "D" and data record "E" of node 1764 corresponding to entity 102, master data record "4" 1778 is a composite of data record "G" of node 1752 corresponding to entity 103 while master data record "5" is a composite of data record "J" and data record "B" of node 1756 corresponding to entity 104.

As discussed above, identity/hierarchy database 78 may be populated through the processing of one or more external data sources by MEI system 30, wherein the external data source may designate a set of records and hierarchical information (e.g., hierarchy links) between the set of records. By processing the set of records and hierarchical information from the external source corresponding links representing relationships (e.g. identity and hierarchy) between the set of records may be created. Relationships in identity/hierarchy database 78 relationships may also be asserted explicitly (e.g. defined) through user input from an operator 40, 42, 44 for almost any reason, such as specialized knowledge, processing by a billing application, etc. In any event, identity/database 78 may comprise a set of existing data hierarchies (e.g. data records associated with identity or hierarchy links) such that if an incoming data record is matched to an existing data record, that data record will be linked to the same entity as the existing data record and thus be hierarchically linked to the same entities as the existing data records.

Figure 19:
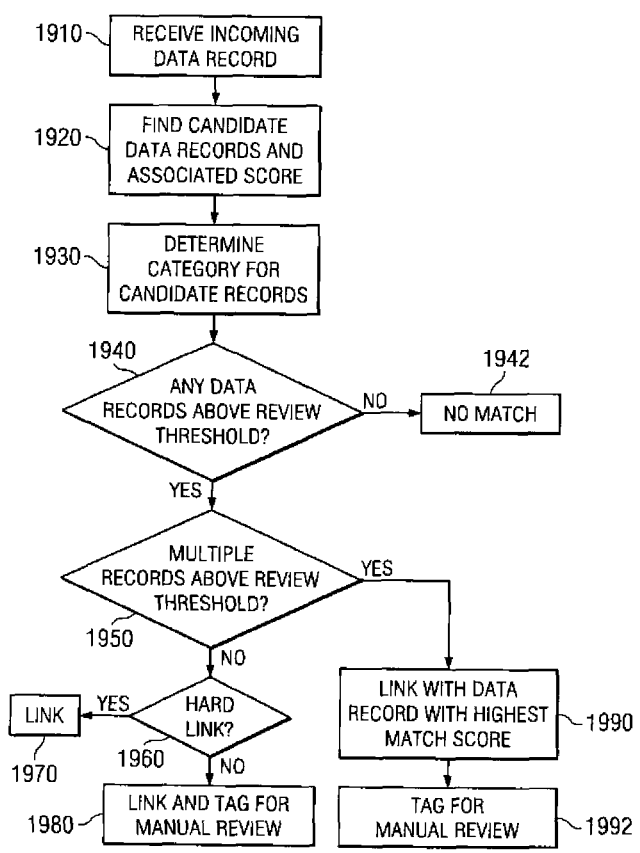
FIG. 19 is a flow diagram of one embodiment of a method for associating data records.

One embodiment for a method of matching incoming data records with existing data records and linking incoming records with existing data records (and thus may be linked with entities) such that incoming data records are incorporated into an existing data hierarchy is depicted in FIG. 19. In one embodiment, matching can also occur across languages and locales (e.g. between data records in different languages), if the incoming data record is already associated with language/locale data records (associations which may be provided by the source providing the data record), if particular fields between data records are common (i.e. company number), etc.

An incoming data record may be received at step 1910, after which a set of candidate data records along with an associated score (e.g. a confidence level or match score) for each of the candidate data records may be generated at step 1920. For each of the candidate data records, then, a category may be determined based on the corresponding score at step 1930. In one embodiment, there may be three categories: "Hard Link", "Soft Link", or "No Link". A Hard Link denotes when a score for a candidate data record is above a configurable automatic link threshold. In other words, the two data records (e.g. the incoming data record and the candidate data record) are considered by MEI system 30 to be same entity. Soft Link denotes when a match score is below the automatic link threshold and above a configurable review threshold, while No Link denotes when a score is below the review threshold and thus the data records are considered not the same entity.

If there are no candidate records with scores above the configurable review threshold at step 1940, the incoming data record may not be matched with any candidate records at step 1942 and may be assigned its own entity identifier and become the root node of a separate data hierarchy. It can then be determined if there are multiple candidate data records with scores above the review threshold (e.g. that fall either into the Hard Link or Soft Link category) at step 1950. If there is only one candidate data record with a score above the review threshold (e.g. "No" branch of step 1950), if the one candidate is above the automatic link threshold at step 1960 (e.g. a Hard Link) an identity link may be formed between the incoming data record and the candidate record at step 1970, and thus the incoming data record may be identically linked to the same entity (e.g. set of data records) to which the candidate record is linked. If the candidate data record's score is above the review threshold, the same type of linking may occur at step 1980, however, this link may be tagged for later manual review by an operator of MEI system 30. During this manual review, the operator can make changes to the links stored in MEI system 30 as needed.

Returning to step 1950, if there is more than one candidate record with scores above the configurable review threshold ("Yes" branch), the incoming data record may be linked with the entity of the candidate record with the highest matching score at step 1990 as described above, however, this link may be tagged for later manual review by an operator of MEI system 30 at step 1992. In one embodiment, if two or more candidate data records have the same match score the incoming data record may be linked to the candidate data record associated with the lowest number entity identifier (though any other methodology of selecting between candidate data records with identical score may likewise be utilized).

Figure 20:
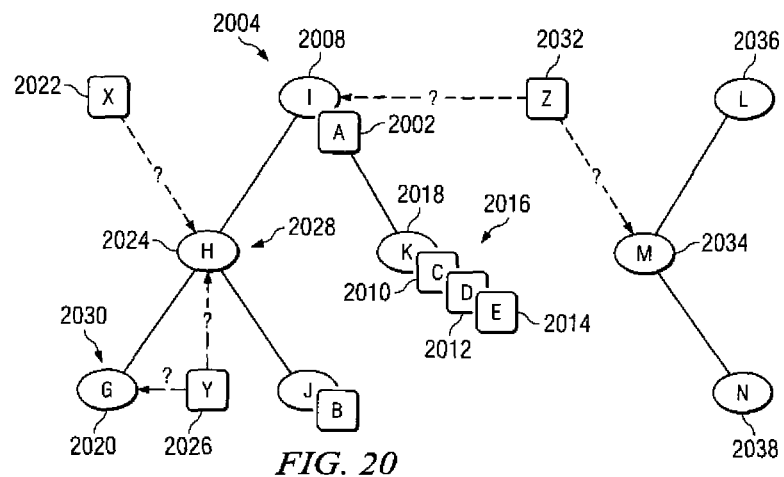
FIG. 20 is a graphical representation of example hierarchies of data records.

The above discussed methodology may be better understood with reference to the graphically depicted example of a data hierarchy of FIG. 20. In FIG. 20, member data records A, B, C, D and E are all hard linked to entities (e.g. one or more data records associated with an entity). More specifically, data record A 2002 may be associated with node 2004 representing an entity with which data record I 2008 is associated. Data records C, D and E 2010, 2012, 2014 may be associated with node 2016 representing an entity with which data record K 2018 is associated, etc. Incoming data record data record X 2022 may have a Soft Link to data record H 2024 associated with node 2028, and thus will be linked with data record H 2024 and tagged and queued for manual review. Data record Y 2026 may have either a Hard or Soft Link to data record H 2024 and data record G 2020 associated with node 2030, and thus will be linked with the higher score (between data record H 2024 and data record G 2020 when compared with data record Y 2026). Data record Z 2032 can have either a Hard or Soft Link to data records I 2008 and data record M 2034, where data records I 2008 and M 2034 are members of different data hierarchies. Data record Z 2032 will again be linked with the higher match score (between data record I 2008 and data record M 2034 when compared with data record Z 3032) and tagged and queued for manual review.

Note that when a data record is identically linked to another data record (and thus is linked to an entity), the data record is also inferred hierarchically linked to all the data records which the data record to which it has been identically linked is hierarchically linked (either explicitly or inferred). For example, suppose an identical link is made between data record Z 2032 and data record M 2034. Though no explicit hierarchy links have been formed between data record Z 2032 and data records L and N 2036, 2038, by virtue of the identity link formed between data record Z 2032 and data record M 2034, data record Z 2032 is inferred hierarchically linked to data records L and N 2036, 2038 in the same way as data record M 2034 is hierarchically linked to data records L and N 2036, 2038.

Figure 21:
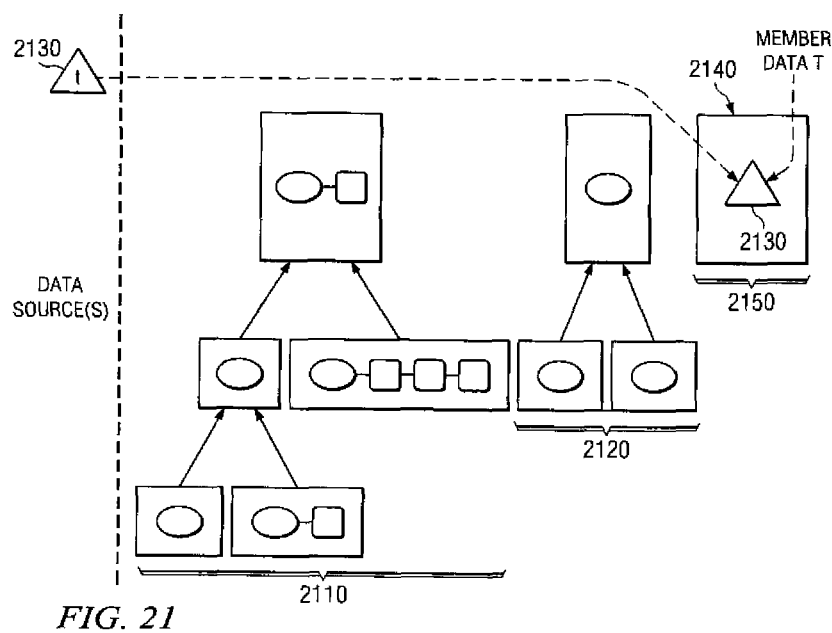
FIGS. 21-26 are graphical representations of examples of associating a data record with a hierarchy of data records.
Figure 22:
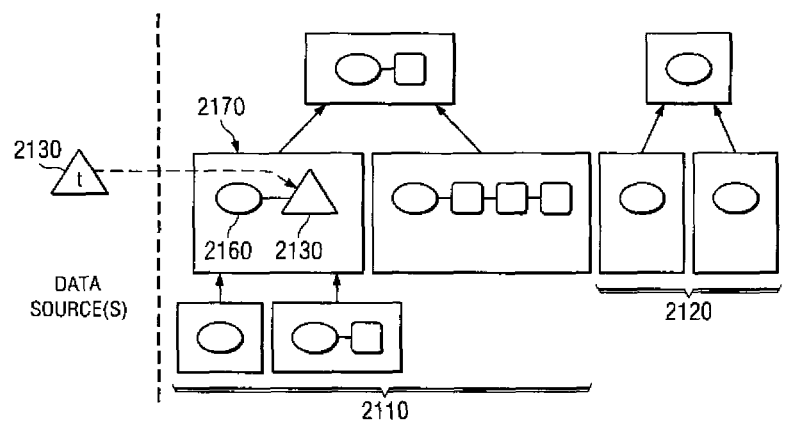

The methodology discussed above with respect to FIG. 19 may be clarified further with respect to FIGS. 21 and 22. In FIG. 21 incoming data record "t" 2130 is compared to existing data records in existing data hierarchies 2110 and 2120 (e.g. data records associated with the nodes of data hierarchies 2110 and 2120). Suppose that data record "t" 2130 does not match any of these data records. In this case data records "t" 2130 may be associated with its own entity 2140 which is designated as a root node of data hierarchy 2150 separate from existing data hierarchies 2110 and 2120 (e.g. data record "t" may be associated with a new entity identifier and a self-identity link is formed with this entity identifier).

If, however, data record "t" 2130 does match an existing data record it may be integrated into an existing data hierarchy. This scenario is depicted in FIG. 22. If data record "t" 2130 matches a data record in existing data hierarchies 2110, 2120 then data record "t" may be linked with the entity with which the matching data record is associated. If the match is a Soft Link this link may be designated for review by an operator or user as discussed above. Furthermore, in one embodiment, if the data record to which data record "t" matches is not designated as primary (e.g. did not originate from a data source designated as primary) the link may also be designated for review. Here, data record "t" 2130 has matched to data record 2160 of node 2170 in existing data hierarchy 2110. Thus, data record "t" will be associated with the entity corresponding to node 2160 as well (e.g., a link formed identically linking data record "t" and data record 2130).

Figure 23:
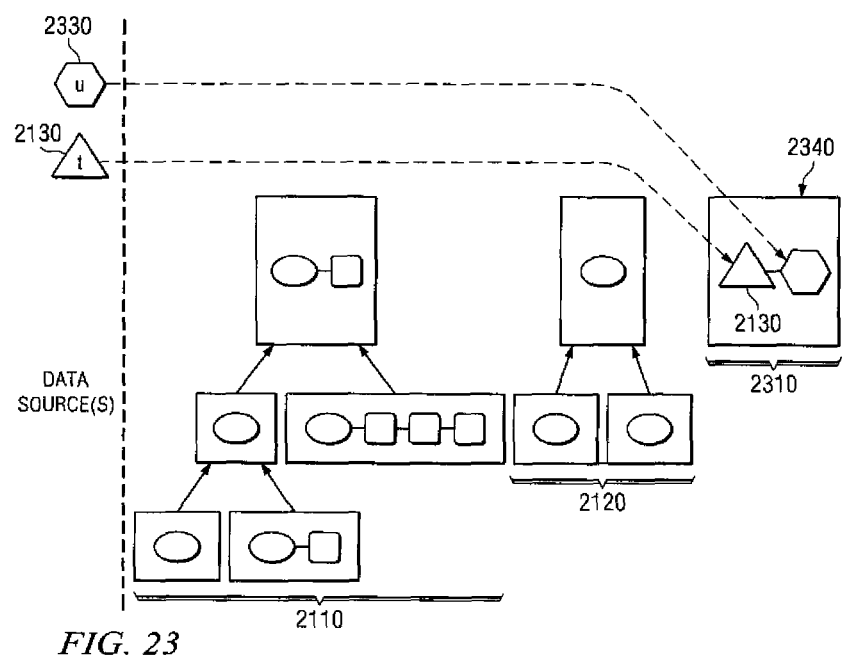
Figure 24:
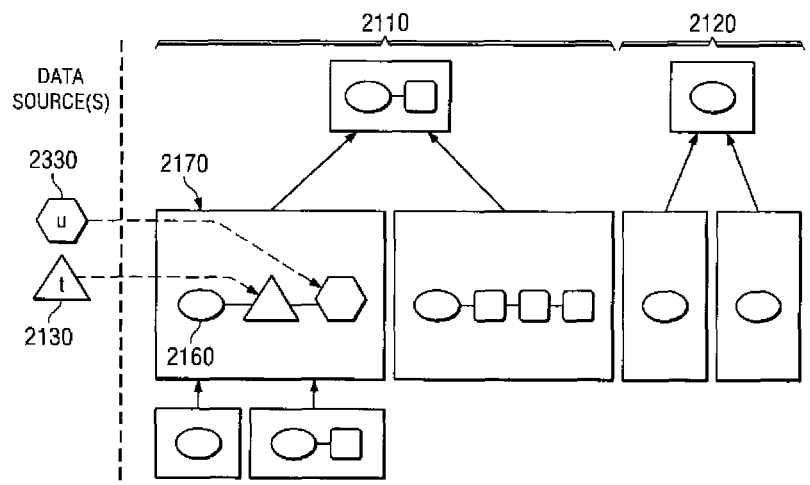

Suppose now a data record comes in from another source. This new data record may likewise be compared against data records in existing data hierarchies. Two examples for such scenarios are depicted in FIGS. 23 and 24. In FIG. 23 incoming data record "u" 2330 is compared to existing data records in existing data hierarchies 2110, 2120 and 2310 (comprising node 2340 associated with data record "t" 2130). If data record "u" 2330 matches data record "t" 2130 data record "u" 2330 may be associated with entity 2340 (comprising data record "t" 2130) (either as a Hard_Link or Soft_Link).

Suppose now, referring to FIG. 24, that incoming data record "u" 2330 matches data record "t" 2130, but that data record "t" 2130 has matched to data record 2160 of node 2170 in existing data hierarchy 2110 (as depicted with respect to FIG. 22). In this case, data record "u" 2330 will be linked with node 2170 as well (e.g., a link formed identically linking data record "u" 2330 and data record "t" 2130). Again, if the match between data record "u" 2330 and data record "t" 2130 is a Soft Link the link may be tagged or designated for review while if the match is a Hard_Link no such review may be necessary.

Figure 25:
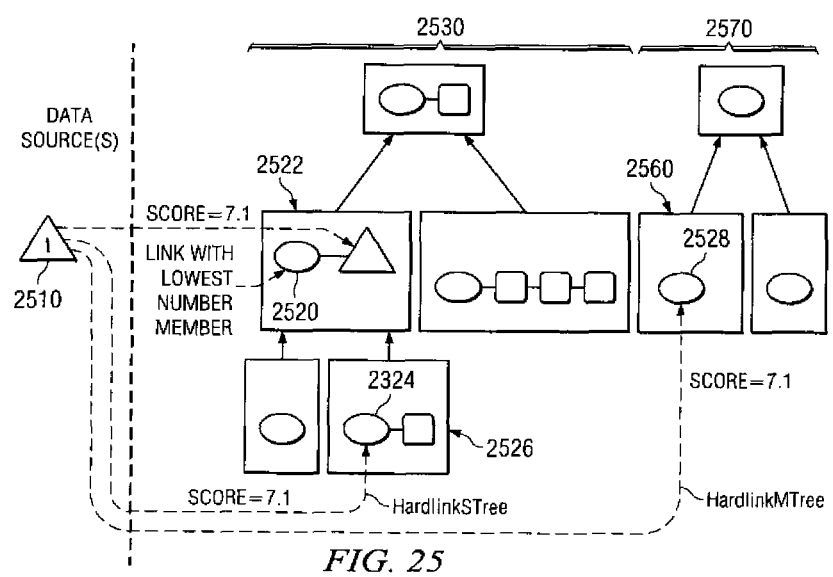

While the above illustrations may be helpful, in many cases an incoming data record may match multiple data records in one or more existing data hierarchies. One example of a scenario of this type is depicted with respect to FIG. 25.

Generally, if an incoming data record matches multiple existing data records the incoming data records may be linked with the matching data record with the highest score and the link may or may not be designated for review by a user. Suppose, however, that an incoming data record matches multiple existing data records in one or more existing data hierarchies and the match score between the incoming data record and each of the matching data records is identical. For example, incoming data record "t" 2510 matches data record 2520 associated with node 2522 of data hierarchy 2530 with a 7.1 match score, data record 2524 associated with node 2526 of data hierarchy 2530 with a 7.1 match score and data record 2528 associated with node 2560 of data hierarchy 2570 with a 7.1 match score. In this case, the incoming data record may be associated with the data record associated with the lowest number entity identifier. Continuing with the above example, suppose node 2522 comprising data record 2520 corresponds to an entity having an entity identifier of "104", node 2526 comprising data record 2524 corresponds to an entity having an entity identifier of "108" and node 2560 comprising data record 2528 corresponds to an entity having an entity identifier of "110". In this case, data record "t" 2510 may be associated with data record 2520 of node 2522 and thus associated with entity identifier "104" (e.g. an identity link may be formed between incoming data record "t" 2510 and data record 2520, for example "104.1X:T, Y" where data record 2520 is "Y", such that incoming data record "t" 2510 is associated with the same entity as data record 2520, the entity in turn corresponding to node 2522).

Tasks may also be created such that this link is reviewed, and may indicate whether the match score is lower than the Hard Link threshold (but above the Soft Link threshold), that the incoming data record has matched data records in multiple data hierarchies, etc. For example, if the match score (e.g., between the incoming data record and the multiple matching data records) is above the Hard Link threshold, a review task may be created for a user which indicates this, along with whether the multiple matching data records lie in a single existing data hierarchy or multiple existing data hierarchies. These review tasks may allow a user to not only review the link that was created by MEI system 30, but the other matching data records as well (e.g., matching but unlinked data records) such that the user can determine if the created link is correct and make any desired adjustments.

Figure 26:
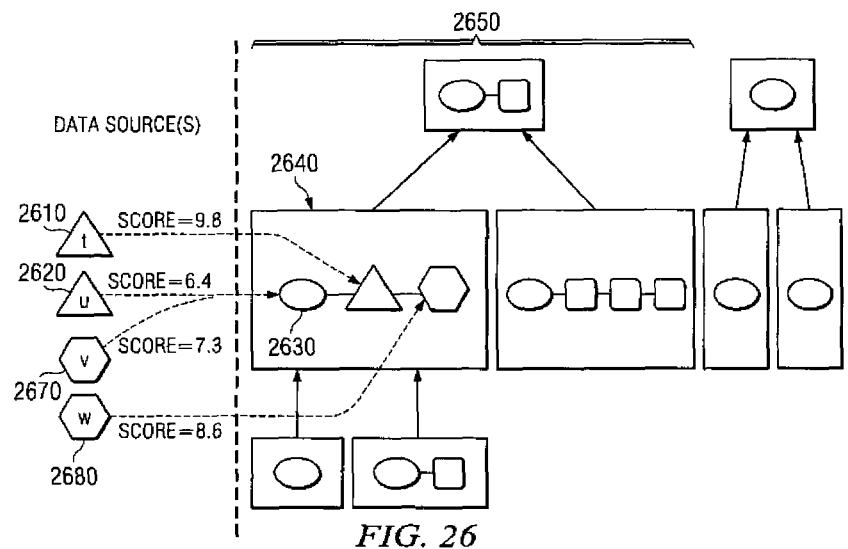

In addition to the above scenarios, it may also occur that multiple incoming data records from multiple data sources may match data records corresponding to a node in a data hierarchy. In this case, in one embodiment, the incoming data record with the highest match score from each data source may be linked to its respective matching data record. An example of this scenario is depicted in FIG. 26, where data record "t" 2610 and data record "u" 2620 may be from one data source and data record "t" 2610 matches data record 2630 associated with node 2640 of data hierarchy 2650 while data record "u" 2620 may also match data record 2630 of node 2640 of data hierarchy 2650. Data record "v" 2670 and data record "w" 2680 may be from another data source and data record "v" 2670 matches data record 2630 associated with node 2640 of data hierarchy 2650 while data record "w" 2680 matches data record 2630 of node 2640 of data hierarchy 2650.

In one embodiment, if two data records from a data source match an existing data record the data record with the highest match score is linked to the existing data record. Thus, in the example depicted, as data record 't' matches data record 2030 with a score of 9.8, and data record "u" 2620 from the same source only matches with a score 6.4, data record "t" 2610 is linked to data record 2630. Similarly as data record "v" 2670 matches data record 2030 with a score of 7.3, and data record "w" 2680 from the same source matches with a higher score of 8.6, data record "w" 2680 is linked to data record 2630 (e.g., an identity link is formed between data records 2610, 2630, and 2680 such that all these data records are associated with one another and node 2640 of data hierarchy 2650). In one embodiment, tasks may also be created such that one or more of these links is reviewed by a user depending on if the match score was above a certain level, or the data records which had scores above a certain threshold (e.g. Soft Link or Hard Link threshold) but which were not linked may be reviewed. Again, as mentioned above, these tasks may indicate if the scores of the unlinked data records were above a certain threshold, etc. In one embodiment, if the lower (soft link) threshold is less than or equal to 6.4, then all incoming records (independent of source) with a match score of 6.4 or above may be linked to data record 2630 and a task may be created based on their pairwise scores respective to the higher (hard link) threshold. More specifically, 2 or more data records from a given source may be allowed to co-exist at the same node in a hierarchy tree assuming if the match score for the data record indicates it is a best match (or meet the tie break criteria of lowest unique identifier) and the match score for the data record is equal to or greater than the lower threshold. The actions to take with respect to this scenario, or almost any other scenario imaginable, may be configurable by a user of the system.

The above depictions of the operation of various embodiments of the present invention may be useful when matching incoming data records to existing data hierarchies, many times, however, sets of data records may be received from information sources 34, 26, 28 where these incoming data records are arranged in an existing data hierarchy (e.g., a set of incoming data records are hierarchically linked, where these hierarchy links may be provided by information sources 34, 26, 28). Thus, it may be desirable not only to associate incoming data records with existing data records or hierarchies, but to index incoming data hierarchies as well, in other words, to associate incoming data records of an incoming data hierarchy with existing entities and reconcile or composite the incoming data hierarchy with any existing data hierarchies to which the existing data records belong.

As may be imagined, reconciling data hierarchies may present a variety of different problems. The most problematic of these obstacles, however, may be the linking of the various data records within each of the data hierarchies to composite (e.g., merge or graft) data hierarchies based upon the matching of data records within each of the hierarchies. For example, it may be relatively simple to map an incoming data hierarchy to an existing data hierarchy if every data record in the incoming hierarchy matches only a single data record of an existing data hierarchy and the hierarchy links between data records of the incoming hierarchy mirror the hierarchy links between the corresponding matching data records in the incoming data hierarchy. It may be more difficult, however, when only a limited number (e.g., less than all) the data records in an incoming data hierarchy match data records within an existing data hierarchy, when data records in incoming hierarchies match multiple data records in multiple existing data hierarchies, when data records match between an existing data hierarchy and an incoming data hierarchy but the hierarchy links between the two data hierarchies do not correspond, etc. In cases such as these, it may still desirable to reconcile an incoming data hierarchy with an existing data hierarchy despite the occurrence of discrepancies (e.g. mismatched data records in the data hierarchies, etc.).

Figure 27A:
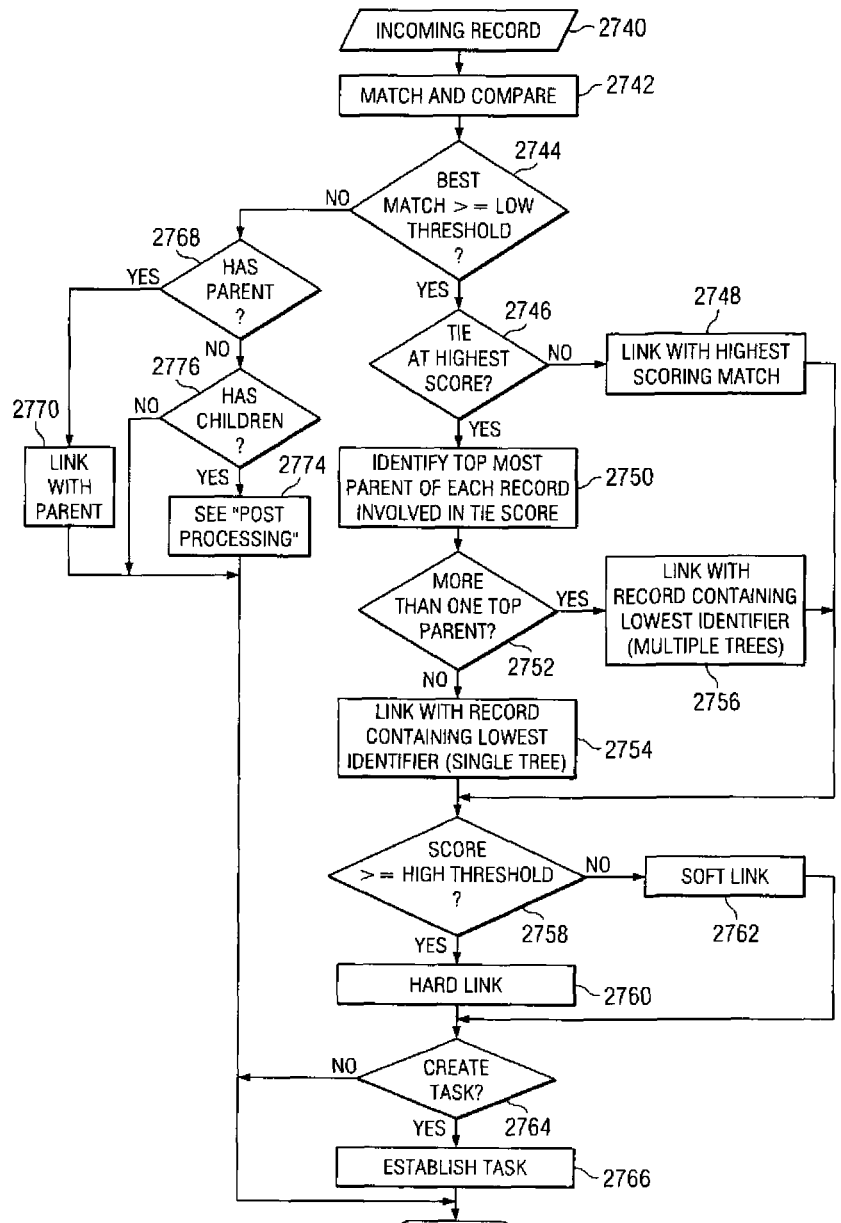
FIGS. 27A and 27B are flow diagrams of one embodiment of a method for associating data records with data hierarchies.
Figure 27B:
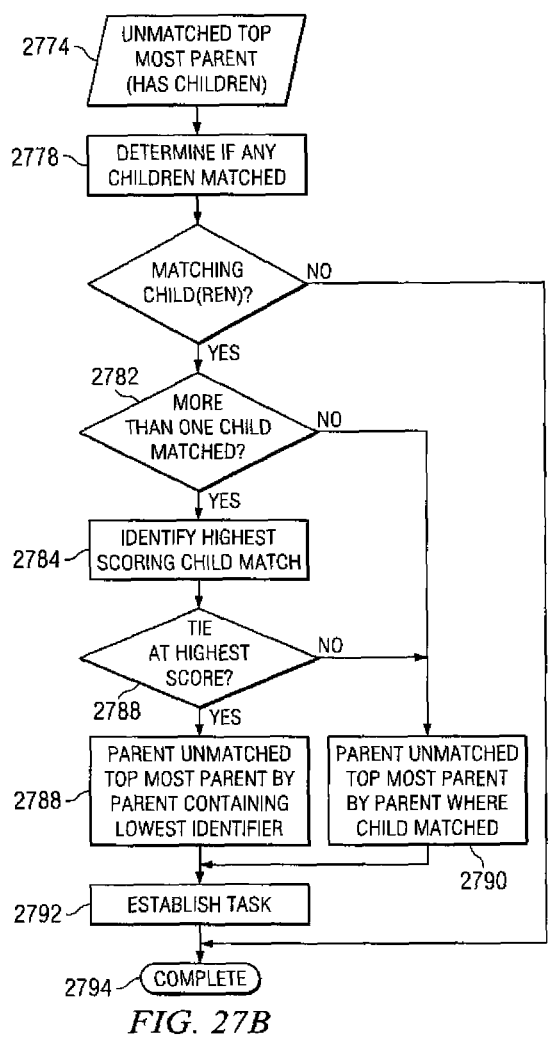

Referring now to FIGS. 27A and 27B, a flow diagram for one embodiment of a method for a match operation between data hierarchies from various sources. These sources may be existing data hierarchies, such as ones already existing in conjunction with MEI, or may be received from information sources 34, 36, 38 which may comprise reference sources such as Dun & Bradstreet, Experian, Axciom, InfoUSA, etc. Thus, each of the data hierarchies being compared may be from one or more of these sources and, via a precedence definition of the sources themselves, each of the data hierarchies may be designated as a primary source, a secondary source, a tertiary source, etc. For example, if an existing data hierarchy in the MEI is ranked higher than a data hierarchy from InfoUSA, the existing data hierarchy may be designated as primary while the data hierarchy from InfoUSA may be designated as a secondary (or non-primary) source.

Specifically with reference now to FIG. 27A, for each incoming data records of a data hierarchy received at step 2740, this data record may be compared to existing data records at step 2742 (e.g. according to the method discussed with respect to FIG. 19). It can then be determined at step 2744 if the associated score for the best matching candidate data record (e.g. best match score) is equal or greater to the review threshold (e.g. above the Soft Link threshold). If the best match score is above the review threshold and if there is not a tie at the highest score at step 2746 (e.g. multiple candidate data records have the best match score), the incoming data records may be identically linked with the candidate records with the best match score at step 2748.

If, however, at step 2746 there are multiple candidate data records with associated match scores equal to the best match score, a top most parent for each of these candidate data records can be determined at step 2750. In one embodiment, the top most parent for a candidate data record may be a root node of a data hierarchy to which the candidate data record belongs. The incoming data record may then be identically linked with the candidate data record with the best match score associated with the lowest entity identifier and record made that the link corresponds to a single tree (e.g. because there was only a single top most parent) at step 2754, or identically linked with the candidate data record with the best match score associated with the lowest entity identifier and record made that the link corresponds to multiple trees at step 2756.

It can then be determined at step 2758 if the best match score associated with a candidate data record is above or equal to an automatic link (e.g. Hard Link) threshold. It is noted if the best match score is below the threshold at step 2762 or above or equal to the threshold at step 2760. At step 2764, then, it can be determined if a task should be created, and if so, a task created at step 2766. These tasks may allow for a user or operator to manually review a link (either identical or hierarchy) created between data records (and possibly the resulting compositing of data hierarchies that result from the linking or comparison of data records in various data hierarchies). In one embodiment, step 2766 the link may comprise a suffix denoting ambiguity in the linking decision relating to the number of data hierarchies to which a data record has been linked and a prefix denoting ambiguity in the scoring. Thus, the step may be two-fold. First, the "suffix" (i.e., STree or MTree) may be determined indicating ambiguity in the linkage decision, then g the "prefix" (i.e., HardLink or SoftLink) ambiguity may be determined. The concatenation of the prefix plus the suffix may then comprise the task type In embodiment, tasks may be created base upon various determinations made during the matching or linking of data records. For example, whether there were multiple candidate data records with the best matching score at step 2746, whether there is one or more top parent was identified at step 2752 (e.g. single tree or multiple tree link), whether the best match score is above the automatic link threshold determined at step 2758 (e.g. Hard Link or Soft Link), etc. A task may be created, for example, if the link between two data records falls below the automatic link threshold (e.g. is a Soft Link) or more than one candidate data records has the best match score.

Returning to step 2744, if the best match score is below the review threshold (e.g. below the Soft Link threshold) it can be determined at step 2768 if the incoming data record has a parent (e.g. is associated with a node of a data hierarchy that is parented by another node). If the incoming data record has a parent then it may be hierarchically linked (P link type) with this parent at step 2770 after which processing for this incoming data record is complete at step 2772. If the incoming data record does not have a parent it may be determined if the incoming data record has children at step 2776 and, if so, this incoming data record designated for post processing at step 2774, completing processing for this data records at step 2772.

Moving now to FIG. 27B, one embodiment of a method for post processing according to an embodiment of a match operation between data hierarchies from various sources is depicted. For each of the incoming data records designated for post processing at step 2774 (e.g., incoming data records not previously linked with a candidate data record which are associated with a node which is a parent of other nodes) it can be determined if any of the children of this incoming data record have been linked to any existing data records at step 2778. If so, and if more than one child of the parent has been matched, as determined at step 2782, each of the highest scoring children may be identified at step 2784. If there is more than one child matching with the highest score, as determined at step 2786, a hierarchy link may be formed between the top most parent associated with the lowest entity identifier and the incoming data record such that the top most parent of the data hierarchy is designated as the parent of the incoming data record at step 2788. Alternatively, at step 2788, it may be determined which of the children with the highest score is associated with the lowest identifier and the parent of this child may then be hierarchically linked to the parent of the hierarchy to which the child matched was. If, however, at step 2786 it is determined that there is only one matching child with the highest score a hierarchy link may be formed between the top most parent associated with the lowest entity identifier and the incoming data record such that the top most parent of the data hierarchy is designated as the parent of the incoming data record at step 2790. A task can then be established such that a user can review this hierarchy link(s) at step 2792 whereupon processing for the particular incoming data record/hierarchy is complete at step 2794.

Figure 28:
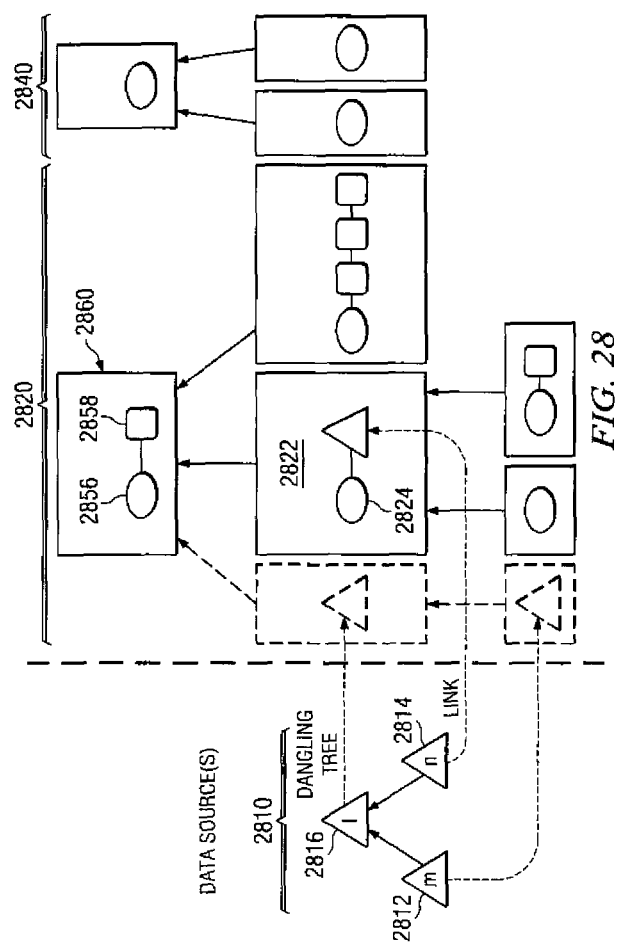

It may be useful to depict various examples of the application of embodiments of the present invention. One such example is depicted in FIG. 28, depicting an example of one embodiment of compositing data hierarchies. In particular, incoming data hierarchy 2810 may comprise data record "m" 2812, data record "n" 2814 and data record "l" 2816, where data records 2812, 2814 and 2816 are hierarchically ordered, specifically where data record "l" 2816 is the parent of both data record "m" 2812 and data record "n" 2814 (e.g. data record "l" 2816 is hierarchically linked to data record "m" 2812 such that data record "m" 2812 is parented by data record "l" 2816).

Data record "n" 2814 is compared against data records associated with data hierarchies 2830, 2840 (e.g. data records of entities associated with nodes of the data hierarchies). Here, data record "n" 2814 may match data record 2822 of node 2824 of data hierarchy 2830. Thus, data record may be identity linked to data record 2822 of data hierarchy 2830. Notice however, that data record "l" 2816 is both unmatched and is a top most parent of a child which has been matched (e.g. data record "n" 2814), thus data records 2856 and 2858 comprising node 2860, the top most parent of data hierarchy 2730 to which data record 2722 (e.g. matching data record "n" 2814) may be identified and a hierarchy link formed between data record "l" 2816 and data record 2856 such that data record "l" 2816 is parented by node 2860 (e.g. entity corresponding to node 2860 parents data record "l" 2816). Similarly, data record "m" 2812 is unmatched. However, as data record "m" 2812 has a parent (e.g. data record "l" 2816) a hierarchy link between data record "l" 2816 and data record "m" 2812 may be established (or remain) such that data record "m" 2812 remains parented by data record "l" 2816 despite the fact that data record "l" 2816 is now parented by node 2860 of data hierarchy 2830.

In this manner, data hierarchy 2810 is composited with data hierarchy 2830. In this case, a task may be created such that the user can review the compositing of data hierarchies 2810 and 2830 (e.g., the links formed between data records to accomplish the compositing of the data hierarchies) or the matching of data record "n" 2814 to data record 2822. This task may identify whether the match score between data record "n" 2714 and data record 2822 was above the review threshold or above an automatic link threshold.

Figure 29:
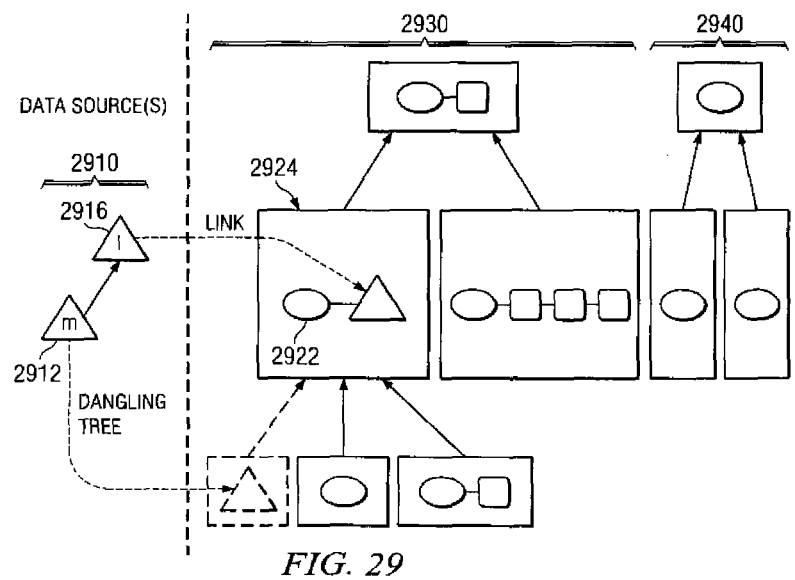
FIGS. 28 and 29 are graphical representations of examples of associating a data record with a hierarchy of data records.

Turning to FIG. 29, another scenario for an example compositing of data hierarchies is depicted. In particular, incoming data hierarchy 2910 may comprise data record "m" 2912 and data record "l" 2916, where data records are hierarchically ordered such that data record "l" 2916 is the parent of data record "m" 2912. Data record "m" 2912 and data record "l" 2916 are compared against data records associated with data hierarchies 2930 and 2940 (e.g. data records of entities associated with nodes of the data hierarchies). Here, data record "l" 2916 may match data record 2922 of entity 2924 of data hierarchy 2930. Thus, data record "l" 2916 may be identity linked to data record 2922 of data hierarchy 2930. Notice however, that data record "m" 2912 is unmatched. As data record "m" 2912 is parented by data record "l" 2916, however, a hierarchy link where data record "m" 2912 is parented by data record "l" 2916 may be established or maintained despite the fact that data record "l" 2916 is now linked to data record 2922 of node 2924 of data hierarchy 2930. In this manner, data hierarchy 2910 is composited with data hierarchy 2930. Again, a task may be created such that the user can review the compositing of data hierarchies 2910 and 2930 or the matching of data record "l" 2916 to data record 2922. This task may be based on whether the match score between data record "l" 2916 to data record 2922 was above the review threshold or above an automatic link threshold.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method for executing on a processor for associating and retrieving data records from one or more databases, comprising:
    receiving a data record;
    identifying a set of candidate data records based on a comparison between a set of existing data records and the received data record, wherein each of the existing data records is associated with an entity identifier value that includes an identity link that links the data record to other data records containing information about the same entity and a hierarchy link that links the data record to other data records that are hierarchically related;
    scoring each of the set of candidate data records, wherein the score of each of the candidate data records determines whether the received data record and each candidate data record comprise information relating to an entity; and
    associating the received data record with a first candidate data record of the set of candidate data records in response to the score of the first candidate data record being greater than a first threshold;
    wherein the first candidate data record is in a first data hierarchy such that the first candidate data record has a first set of hierarchical associations with a first set of related data records, and association of the received data record with the first candidate data record also results in the received data record being associated via the first set of hierarchical associations with the first set of related data records such that a subsequent query that retrieves the received data record will also retrieve the first candidate data record and the first set of related data records via the first set of hierarchical associations.

2. The method of claim 1, further comprising establishing the received data record as a root of a second data hierarchy in response to the scores of each of the set of candidate data records being below the first threshold.

3. The method of claim 1, further comprising determining whether the score of the first candidate data record is greater than the score of each of the other set of candidate data records.

4. The method of claim 1, wherein,
    in response to the first candidate data record being among a group of candidate data records all having the same score, the first candidate data record is selected over other candidate data records in the group based upon the first candidate data record having the lowest entity identifier value within the group.

5. The method of claim 1, further comprising:
    determining whether the score of the first candidate data record is less than a second threshold; and
    creating a task for a user in response to the score of the first candidate data record being below the second threshold.

6. The method of claim 1, wherein the received data record is in a second data hierarchy that includes a second set of related data records, and, in response to the received data record being associated with the first data record, compositing the first data hierarchy with the second data hierarchy to form a composite data hierarchy such that a subsequent query that retrieves the received data record will also retrieve the first and second sets of related data records via the composite data hierarchy.

7. The method of claim 6, further comprising:
   determining whether the received data record has a child data record in the second data hierarchy; and
   in response to associating the received data record with the first data record, further associating the child data record with both the received data record and the first data record with both the received data record and the first data record parenting the child data record.

8. The method of claim 6, further comprising:
   determining whether the received data record has a first parent data record in the second data hierarchy; and
   in response to associating the received data record with the first data record:
      determining a top most parent of the first data hierarchy; and
      associating the first parent data record of the second data hierarchy with the top most parent of the first data hierarchy with the first parent data record being parented by the top most parent of the first data hierarchy.

9. The method of claim 1, wherein the first candidate data record and the received data record are located at the same hierarchical position within the first set of hierarchical associations.

10. The method of claim 1, wherein the first candidate data record and the received data record are located at different hierarchical positions within the first set of hierarchical associations.

11. A system for associating and retrieving data records from one or more databases, comprising:
    an information source comprising at least one database; and
    a processor coupled with the information source and configured with logic to perform a plurality of operations in relation to the information source, the plurality of operations comprising:
    receiving a data record;
    identifying a set of candidate data records based on a comparison between a set of existing data records and the received data record, wherein each of the existing data records is associated with an entity identifier value that includes an identity link that links the data record to other data records containing information about the same entity and a hierarchy link that links the data record to other data records that are hierarchically related;
    scoring each of the set of candidate data records, wherein the score of each of the candidate data records determines whether the received data record and each candidate data record comprise information relating to the same entity; and
    associating the received data record with a first candidate data record of the set of candidate data records in response to the score of the first candidate data record being greater than a first threshold;
    wherein the first candidate data record is in a first data hierarchy such that the first candidate data record has a first set of hierarchical associations with a first set of related data records, and association of the received data record with the first candidate data record also results in the received data record being associated via the first set of hierarchical associations with the first set of related data records such that a subsequent query that retrieves the received data record will also retrieve the first candidate data record and the first set of related data records via the first set of hierarchical associations.

12. The system of claim 11, wherein the processor is further configured with logic to:
    establish the received data record as a root of a second data hierarchy in response to the scores of each of the set of candidate data records being below the first threshold.

13. The system of claim 11, wherein the processor is further configured with logic to:
    in response to a determination that the first candidate data record is among a group of candidate data records all having the same score, select the first candidate data record over other candidate data records in the group based upon the first candidate data record having the lowest entity identifier value within the group.

14. The system of claim 11, wherein the received data record is in a second data hierarchy that includes a second set of related data records, and the processor is further configured with logic to:
    in response to the received data record being associated with the first data record, composite the first data hierarchy with the second data hierarchy to form a composite data hierarchy such that a subsequent query that retrieves the received data record will also retrieve the first and second sets of related data records via the composite data hierarchy.

15. A computer program product for associating and retrieving data records from one or more databases, the computer program product comprising:
    a non-transitory computer readable storage medium having computer readable program code embodied therewith, the computer readable program code configured to perform a plurality of operations in relation to an information source, the information source comprising one or more databases, the plurality of operations comprising:
    receiving a data record;
    identifying a set of candidate data records based on a comparison between a set of existing data records and the received data record, wherein each of the existing data records is associated with an entity identifier value that includes an identity link that links the data record to other data records containing information about the same entity and a hierarchy link that links the data record to other data records that are hierarchically related;
    scoring each of the set of candidate data records, wherein the score of each of the candidate data records determines whether the received data record and each candidate data record comprise information relating to the same entity; and
    associating the received data record with a first candidate data record of the set of candidate data records in response to the score of the first candidate data record being greater than a first threshold;
    wherein the first candidate data record is in a first data hierarchy such that the first candidate data record has a first set of hierarchical associations with a first set of related data records, and association of the received data record with the first candidate data record also results in the received data record being associated via the first set of hierarchical associations with the first set of related data records such that a subsequent query that retrieves the received data record will also retrieve the first candidate data record and the first set of related data records via the first set of hierarchical associations.

16. The computer program product of claim 15, wherein the non-transitory computer readable program code is further configured to:
  establish the received data record as a root of a second data hierarchy in response to the scores of each of the set of candidate data records being below the first threshold.

17. The computer program product of claim 15, wherein the non-transitory computer readable program code is further configured to:
  in response to a determination that the first candidate data record is among a group of candidate data records all having the same score, select the first candidate data record over other candidate data records in the group based upon the first candidate data record having the lowest entity identifier value within the group.

18. The computer program product of claim 15, wherein the received data record is in a second data hierarchy that includes a second set of related data records, and the non-transitory computer readable program code is further configured to:
  in response to the received data record being associated with the first data record, composite the first data hierarchy with the second data hierarchy to form a composite data hierarchy such that a subsequent query that retrieves the received data record will also retrieve the first and second sets of related data records via the composite data hierarchy.

19. The computer program product of claim 18, wherein the non-transitory computer readable program code is further configured to:
  determine whether the received data record has a child data record in the second data hierarchy; and
  in response to associating the received data record with the first data record, further associate the child data record with both the received data record and the first data record with both the received data record and the first data record parenting the child data record.

20. The computer program product of claim 18, wherein the non-transitory computer readable program code is further configured to:
  determine whether the received data record has a first parent data record in the second data hierarchy; and
  in response to associating the received data record with the first data record:
    determine a top most parent of the first data hierarchy; and
    associate the first parent data record of the second data hierarchy with the top most parent of the first data hierarchy with the first parent data record being parented by the top most parent of the first data hierarchy.

* * * * *